US012731183B2

(12) United States Patent
Bockius et al.

(10) Patent No.: US 12,731,183 B2
(45) **Date of Patent: *Sep. 8, 2026**

(54) SYSTEMS, METHODS, AND DEVICES FOR UNIFIED E-COMMERCE PLATFORMS FOR UNIQUE ITEMS

(71) Applicant: VAST.COM, INC., Austin, TX (US)

(72) Inventors: Chad Matthew Bockius, Austin, TX (US); David Wayne Franke, Austin, TX (US); Jason Michael Duke, Austin, TX (US); Danil P. Suits, Waltham, MA (US); Glenn Elliot Goldenberg, Austin, TX (US); Davor Kracanovic, Belgrade (RS)

(73) Assignee: VAST.COM, INC., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/811,566

(22) Filed: Aug. 21, 2024

(65) Prior Publication Data

US 2025/0166050 A1 May 22, 2025

Related U.S. Application Data

(63) Continuation of application No. 17/443,127, filed on Jul. 21, 2021, now Pat. No. 12,106,358.

(Continued)

(51) Int. Cl.

*G06Q 30/0601* (2023.01)
*G06Q 10/087* (2023.01)

(52) U.S. Cl.

CPC ....... *G06Q 30/0641* (2013.01); *G06Q 10/087* (2013.01)

(58) Field of Classification Search

CPC ......................... G06Q 30/0641; G06Q 10/087

(Continued)

(56) References Cited

U.S. PATENT DOCUMENTS 5,459,656 A 10/1995 Fields
5,687,322 A 11/1997 Deaton et al.

(Continued)

FOREIGN PATENT DOCUMENTS

WO WO-2013006696 A1 * 1/2013 ......... G06Q 30/0641

OTHER PUBLICATIONS

Kozhevnikov, Ivan, et al, "Comparison of Different Approaches for Hotels Deduplication," Sep. 2016, 7th International Conference, KESW 2016 (Year: 2016).*

(Continued)

*Primary Examiner* — Marissa Thein
*Assistant Examiner* — Thomas Joseph Sullivan
(74) *Attorney, Agent, or Firm* — Ashurst Perkins Coie US LLP

(57) ABSTRACT

An e-commerce backbone system for facilitating a unified marketplace for unique items includes: a dealer system interface configured to communicate over a computer network with a plurality of dealer marketplace systems; a normalization engine configured to: translate data received from the plurality of dealer marketplace systems into data compliant with a standardized data model; and translate data sent to the plurality of dealer marketplace systems from data compliant with the standardized data model into data compliant with requirements of each individual dealer marketplace system; a dealer mappings database configured to store mappings that define translation methods for each individual dealer marketplace system; and a marketplace application programming interface (API) engine configured to present an API for sending and receiving data from one or more unified marketplace systems.

19 Claims, 14 Drawing Sheets

Related U.S. Application Data

(60) Provisional application No. 63/056,381, filed on Jul. 24, 2020.

(58) Field of Classification Search
USPC ........................................................ 705/27.1
See application file for complete search history.

(56) References Cited

U.S. PATENT DOCUMENTS 6,026,388 A 2/2000 Liddy et al.
6,029,195 A 2/2000 Herz
6,052,439 A 4/2000 Gerszberg
6,266,649 B1 7/2001 Linden
6,430,539 B1 8/2002 Lazarus et al.
6,510,406 B1 1/2003 Marchisio
6,539,392 B1 3/2003 Rebane
6,611,726 B1 8/2003 Crosswhite
6,711,581 B2 3/2004 Rebane
6,751,600 B1 6/2004 Wolin
6,751,614 B1 6/2004 Rao
6,775,664 B2 8/2004 Lang et al.
6,873,983 B2 3/2005 Ugai et al.
6,886,005 B2 4/2005 Davis
7,013,005 B2 3/2006 Yacoub et al.
7,069,258 B1 6/2006 Bothwell
7,165,119 B2 1/2007 Fish
7,167,871 B2 1/2007 Farahat et al.
7,191,143 B2 3/2007 Keli et al.
7,206,780 B2 4/2007 Slackman
7,225,107 B2 5/2007 Buxton et al.
7,243,102 B1 7/2007 Naam et al.
7,260,568 B2 8/2007 Zhang et al.
7,283,951 B2 10/2007 Marchisio et al.
7,293,017 B2 11/2007 Hurst-Hiller et al.
7,356,430 B2 4/2008 Miguelanez et al.
7,395,170 B2 7/2008 Scott et al.
7,398,201 B2 7/2008 Marchisio et al.
7,433,885 B2 10/2008 Jones
7,440,955 B2 10/2008 Khandelwal et al.
7,444,308 B2 10/2008 Guyon et al.
7,467,232 B2 12/2008 Fish et al.
7,509,321 B2 3/2009 Wong et al.
7,523,047 B1 4/2009 Neal et al.
7,542,947 B2 6/2009 Guyon et al.
7,565,362 B2 7/2009 Brill et al.
7,593,904 B1 9/2009 Kirshenbaum et al.
7,593,934 B2 9/2009 Li et al.
7,596,505 B2 9/2009 Keil et al.
7,596,552 B2 9/2009 Levy et al.
7,603,348 B2 10/2009 He et al.
7,631,008 B2 12/2009 Carson et al.
7,636,715 B2 12/2009 Kalleh
7,647,314 B2 1/2010 Sun et al.
7,657,493 B2 2/2010 Meijer et al.
7,660,581 B2 2/2010 Ramer et al.
7,664,746 B2 2/2010 Majumder
7,672,865 B2 3/2010 Kumar et al.
7,680,835 B2 3/2010 MacLaurin et al.
7,685,197 B2 3/2010 Fain et al.
7,693,818 B2 4/2010 Majumder
7,693,901 B2 4/2010 Ka et al.
7,716,202 B2 5/2010 Slackman
7,716,217 B2 5/2010 Marston et al.
7,716,225 B1 5/2010 Dean et al.
7,716,226 B2 5/2010 Barney
7,725,307 B2 5/2010 Bennett
7,725,451 B2 5/2010 Jing et al.
7,739,408 B2 6/2010 Fish et al.
7,761,447 B2 7/2010 Brill et al.
7,788,252 B2 8/2010 Delli Santi et al.
7,801,358 B2 9/2010 Furmaniak et al.
7,801,843 B2 9/2010 Kumar et al.
7,802,197 B2 9/2010 Lew et al.
7,805,331 B2 9/2010 Demir et al.
7,805,385 B2 9/2010 Steck et al.
7,805,438 B2 9/2010 Liu et al.
7,809,740 B2 10/2010 Chung et al.
7,818,186 B2 10/2010 Bonissone et al.
7,827,060 B2 11/2010 Wright et al.
7,827,170 B1 11/2010 Horling et al.
7,831,463 B2 11/2010 Nagar
7,836,057 B1 11/2010 Micaelian et al.
7,849,030 B2 12/2010 Ellingsworth
7,860,871 B2 12/2010 Ramer et al.
7,865,187 B2 1/2011 Ramer et al.
7,865,409 B1 * 1/2011 Monaghan .......... G06Q 10/087
705/28
7,865,418 B2 1/2011 Uenohara et al.
7,870,017 B2 1/2011 Kamath
7,895,193 B2 2/2011 Cucerzan et al.
7,899,455 B2 3/2011 Ramer et al.
7,899,707 B1 3/2011 Mesaros
7,904,448 B2 3/2011 Chung et al.
7,908,238 B1 3/2011 Nolet et al.
7,912,458 B2 3/2011 Ramer et al.
7,912,713 B2 3/2011 Vair et al.
7,921,068 B2 4/2011 Guyon et al.
7,921,069 B2 4/2011 Canny et al.
7,930,197 B2 4/2011 Ozzie et al.
7,933,388 B1 4/2011 Vanier et al.
7,937,345 B2 5/2011 Schmidtler et al.
7,941,329 B2 5/2011 Kenedy et al.
7,958,067 B2 6/2011 Schmidtler et al.
7,966,219 B1 6/2011 Singh et al.
7,987,261 B2 7/2011 Gamble
8,001,121 B2 8/2011 Wang et al.
8,005,643 B2 8/2011 Tunkelang et al.
8,005,684 B1 8/2011 Cheng et al.
8,005,774 B2 8/2011 Chapelle
8,005,826 B1 8/2011 Sahami et al.
8,015,065 B2 9/2011 Davies
8,024,327 B2 9/2011 Tunkelang et al.
8,024,349 B1 9/2011 Shao et al.
8,027,864 B2 9/2011 Gilbert
8,027,865 B2 9/2011 Gilbert
8,032,405 B2 10/2011 Gilbert
8,051,033 B2 11/2011 Kenedy et al.
8,051,073 B2 11/2011 Tunkelang et al.
8,065,184 B2 11/2011 Wright et al.
8,065,254 B1 11/2011 Das et al.
8,069,055 B2 11/2011 Keen
8,078,606 B2 12/2011 Slackman
8,095,523 B2 1/2012 Brave et al.
8,099,376 B2 1/2012 Serrano-Morales et al.
8,126,881 B1 2/2012 Sethi et al.
8,326,845 B2 12/2012 Sethi et al.
8,375,037 B2 2/2013 Sethi et al.
8,600,823 B1 12/2013 Raines et al.
8,620,717 B1 12/2013 Micaelian et al.
8,620,915 B1 12/2013 Brukman et al.
8,645,844 B1 2/2014 Strobel et al.
8,650,093 B2 2/2014 Seergy et al.
8,744,925 B2 6/2014 Seergy et al.
8,868,572 B2 10/2014 Sethi et al.
8,954,424 B2 2/2015 Gupta et al.
9,104,718 B1 8/2015 Levy et al.
9,123,075 B2 9/2015 Seergy et al.
9,141,984 B2 9/2015 Seergy et al.
9,147,216 B2 9/2015 Seergy et al.
9,324,104 B1 4/2016 Levy et al.
9,460,467 B2 10/2016 Seergy et al.
9,465,873 B1 10/2016 Franke et al.
9,626,704 B2 4/2017 Seergy et al.
9,665,897 B2 5/2017 Seergy et al.
9,690,857 B1 6/2017 Franke et al.
9,710,843 B2 7/2017 Levy et al.
9,799,000 B2 10/2017 Sethi et al.
9,830,635 B1 11/2017 Levy et al.
10,007,946 B1 6/2018 Levy et al.
10,109,001 B1 10/2018 Levy et al.
10,115,074 B1 10/2018 Sethi et al.
10,127,596 B1 11/2018 Franke et al.
10,140,655 B2 11/2018 Seergy et al.
10,157,231 B1 12/2018 Franke et al.

(56) References Cited

U.S. PATENT DOCUMENTS 10,223,720 B2 3/2019 Seergy et al.
10,223,722 B2 3/2019 Seergy et al.
10,268,704 B1 4/2019 Sanderson et al.
10,475,208 B1 11/2019 Morrison et al.
10,572,555 B1 2/2020 Franke et al.
10,643,265 B2 5/2020 Levy et al.
10,796,362 B2 10/2020 Seergy et al.
10,839,442 B1 11/2020 Levy et al.
10,942,976 B2 3/2021 Franke et al.
10,963,942 B1 3/2021 Franke et al.
11,127,067 B1 9/2021 Levy et al.
11,210,318 B1 12/2021 Sanderson et al.
11,257,101 B2 2/2022 Hansen et al.
11,270,252 B1 3/2022 Sethi et al.
11,423,100 B1 8/2022 Franke et al.
11,651,411 B1 5/2023 Levy et al.
11,755,598 B1 9/2023 Sethi et al.
11,886,518 B1 1/2024 Franke et al.
12,008,626 B1 6/2024 Levy et al.
12,106,358 B1 10/2024 Bockius et al.
12,141,854 B1 11/2024 Levy et al.
12,326,910 B2 6/2025 Franke et al.
12,367,517 B1 7/2025 Levy et al.
2001/0034686 A1 10/2001 Eder
2002/0035520 A1 3/2002 Weiss
2002/0077931 A1 6/2002 Henrion et al.
2002/0169715 A1 11/2002 Ruth et al.
2003/0004745 A1 1/2003 Takakura
2003/0014402 A1 1/2003 Sealand et al.
2003/0033190 A1 2/2003 Shan et al.
2003/0088457 A1 5/2003 Keil et al.
2003/0089218 A1 5/2003 Gang et al.
2003/0126026 A1 7/2003 Gronberg et al.
2003/0225644 A1 12/2003 Casati et al.
2003/0229552 A1 12/2003 Lebaric et al.
2005/0027670 A1 2/2005 Petropoulos
2005/0086070 A1 4/2005 Engelman
2005/0154717 A1 7/2005 Watson et al.
2005/0189415 A1 9/2005 Fano et al.
2005/0234574 A1 10/2005 Lam et al.
2006/0026081 A1 2/2006 Keil et al.
2006/0041465 A1 2/2006 Woehler
2006/0248035 A1 11/2006 Gendler
2007/0027741 A1 2/2007 Gruhl et al.
2007/0060114 A1 3/2007 Ramer et al.
2007/0060129 A1 3/2007 Ramer et al.
2007/0124110 A1 5/2007 Tung
2007/0143184 A1 6/2007 Szmanda
2007/0156514 A1 7/2007 Wright et al.
2007/0156621 A1 7/2007 Wright et al.
2007/0156887 A1 7/2007 Wright et al.
2007/0239373 A1 10/2007 Nasle
2007/0239518 A1 10/2007 Chung et al.
2007/0294154 A1 12/2007 Henninger
2008/0040151 A1 2/2008 Moore
2008/0065425 A1 3/2008 Giuffre et al.
2008/0154761 A1 6/2008 Flake et al.
2008/0162574 A1 7/2008 Gilbert
2008/0222010 A1 9/2008 Hudak et al.
2008/0270398 A1 10/2008 Landau et al.
2008/0275757 A1 11/2008 Sharma et al.
2009/0006118 A1 1/2009 Pollak
2009/0011927 A1 1/2009 Chen et al.
2009/0112927 A1 4/2009 Chitnis et al.
2010/0145813 A1* 6/2010 Veseli .................... G06Q 20/20 705/28
2011/0055207 A1 3/2011 Schorzman et al.
2011/0119287 A1 5/2011 Chen et al.
2012/0005045 A1 1/2012 Baker
2012/0047158 A1 2/2012 Lee et al.
2012/0143861 A1 6/2012 Sethi et al.
2012/0143924 A1 6/2012 Sethi et al.
2012/0239582 A1 9/2012 Solari et al.
2012/0303412 A1 11/2012 Etzioni et al.
2013/0006801 A1 1/2013 Solari et al.
2013/0030870 A1 1/2013 Swinson et al.
2013/0073411 A1 3/2013 Bhogal et al.
2013/0073413 A1 3/2013 Bhogal et al.
2013/0159057 A1 6/2013 Hsiao
2013/0173453 A1 7/2013 Raines et al.
2013/0179252 A1 7/2013 Dong et al.
2013/0246300 A1 9/2013 Fischer
2013/0282734 A1 10/2013 Sethi et al.
2014/0032572 A1 1/2014 Eustice et al.
2014/0046804 A1 2/2014 Nadjarian et al.
2014/0100989 A1 4/2014 Zhang
2014/0236875 A1 8/2014 Phillipps et al.
2014/0257934 A1 9/2014 Chrzan et al.
2014/0258042 A1 9/2014 Butler et al.
2014/0258044 A1 9/2014 Chrzan et al.
2014/0279195 A1 9/2014 Kubicki et al.
2015/0100420 A1 4/2015 Van Horn et al.
2015/0220876 A1 8/2015 Sethi et al.
2015/0310131 A1 10/2015 Greystoke et al.
2015/0324737 A1 11/2015 Chrzan et al.
2015/0324879 A1 11/2015 Lu et al.
2015/0363838 A1* 12/2015 Wu .................... G06Q 30/0278 705/306
2016/0343058 A1 11/2016 Levy et al.
2017/0011444 A1 1/2017 Greystoke et al.
2017/0323499 A1* 11/2017 Moore ............. G06K 19/06028
2017/0372402 A1 12/2017 Levy et al.
2018/0053250 A1* 2/2018 Fisher .................... G06Q 30/08
2019/0251586 A1 8/2019 Stutsman et al.
2019/0318401 A1* 10/2019 Schulz ............... G06Q 30/0603
2020/0293580 A1 9/2020 Franke et al.
2021/0118016 A1 4/2021 Abedinzadeh et al.
2022/0051304 A1 2/2022 Horen et al.
2024/0046209 A1 2/2024 Sethi et al.
2024/0273148 A1 8/2024 Franke et al.
2025/0005645 A1 1/2025 Levy et al.
2025/0148522 A1 5/2025 Levy et al.
2025/0342214 A1 11/2025 Franke et al.
2025/0384475 A1 12/2025 Vast et al.

OTHER PUBLICATIONS

Persaud et al., "Innovative mobile marketing via smartphones: Are consumers ready?", Article in Marketing Intelligence & Planning, Jun. 2012.

Antczak; "On Regularization Properties of Artificial Datasets for Deep Learning"; Aug. 2019; https://web.archive.org/web/20210401000000*/http://arxiv.org/abs/1908.07005v1 (Year: 2019).

Kim; "Embedding Transfer with Label Relaxation for Improved Metric Learning"; Mar. 2021; https://arxiv.org/pdf/2103.14908.pdf (Year: 2021).

Trippi; "Estimating the Relationship Between Price and Time to Sale For Investment Property"; Apr. 1977; Management Science, vol. 23, No. 8 (Year: 1977).

File History and the references cited therein of U.S. Appl. No. 16/181,108, filed Nov. 5, 2018, issued Feb. 25, 2020 as U.S. Pat. No. 10,572,555 B1.

File History and the references cited therein of U.S. Appl. No. 16/744,581, filed Jan. 16, 2020, issued Mar. 9, 2021 as U.S. Pat. No. 10,942,976 B2.

File History and the references cited therein of U.S. Appl. No. 17/162,194, filed Jan. 29, 2021, issued Aug. 23, 2022 as U.S. Pat. No. 11,423,100 B1.

File History and the references cited therein of U.S. Appl. No. 17/813,180, filed Jul. 18, 2022, issued Jan. 30, 2024 as U.S. Pat. No. 11,886,518 B1.

File History and the references cited therein of U.S. Appl. No. 18/426,200, filed Jan. 29, 2024, issued Jun. 10, 2025 as U.S. Pat. No. 12,326,910 B2.

File History of U.S. Appl. No. 61/776,347, filed Mar. 11, 2013.

File History of U.S. Appl. No. 61/779,069, filed Mar. 13, 2013.

File History and the references cited therein of U.S. Appl. No. 19/246,407, filed Jun. 23, 2025, published Dec. 18, 2025 as U.S. Publication No. 2025-0384475 A1.

File History of U.S. Appl. No. 62/571,691, filed Oct. 12, 2017.

(56) References Cited

OTHER PUBLICATIONS

File History and the references cited therein of U.S. Appl. No. 16/158,189, filed Oct. 11, 2018, issued Apr. 23, 2019 as U.S. Pat. No. 10,268,704 B1.
File History and the references cited therein of U.S. Appl. No. 16/277,803, filed Feb. 15, 2019, issued Dec. 28, 2021 as U.S. Pat. No. 11,210,318 B1.
File History and the references cited therein of U.S. Appl. No. 17/455,119, filed Nov. 16, 2021.
File History of U.S. Appl. No. 63/105,454, filed Oct. 26, 2020.
File History and the references cited therein of U.S. Appl. No. 17/452,023, filed Oct. 22, 2021.
File History of U.S. Appl. No. 63/056,381, filed Jul. 24, 2020.
File History and the references cited therein of U.S. Appl. No. 17/443,127, filed Jul. 21, 2021, issued Oct. 1, 2024 as U.S. Pat. No. 12,106,358 B1.
A personalized recommendation system based on product taxonomy for one-to-one marketing online. Lun-ping Hung. Expert Systems with Applications. vol. 29, Issue 2, Aug. 2005, pp. 383-392. (Year: 2005).
Celina M. Olszak and Ewa Ziemba, Business Intelligence Systems in the Holistic Infrastructure Development Supporting Decision-Making in Organisations, University of Economics, Katowice, Poland, vol. 1 (Year: 2006).
Efficient Query Evaluation using a Two-Level Retrieval Process. Andrei Z. Broder, David Carmel, Michael Herscovici, Aya Softer, Jason Zien. CIKM '03: Proceedings of the twelfth international conference on Information and knowledge management. Nov. 2003 (Year: 2003).
File History and references cited therein of U.S. Appl. No. 15/981,750, filed May 16, 2018.
File History and references cited therein of U.S. Appl. No. 17/168,573, filed Feb. 5, 2021.
File History and references cited therein of U.S. Appl. No. 18/191,679, filed Mar. 28, 2023.
File History and references cited therein of U.S. Appl. No. 19/208,489, filed May 14, 2025.
File History and the references cited therein of corresponding U.S. Appl. No. 14/060,434, filed Oct. 22, 2013, issued Nov. 28, 2017 as U.S. Pat. No. 9,830,635 B1.
File History and the references cited therein of corresponding U.S. Appl. No. 15/794,517, filed Oct. 26, 2017, issued Oct. 23, 2018 as U.S. Pat. No. 10,109,001 B1.
File History and the references cited therein of corresponding U.S. Appl. No. 16/134,421, filed Sep. 18, 2018, issued Nov. 17, 2020 as U.S. Pat. No. 10,839,442 B1.
File History and the references cited therein of corresponding U.S. Appl. No. 17/066,839, filed Oct. 9, 2020, issued May 16, 2023 as U.S. Pat. No. 11,651,411 B1.
File History and the references cited therein of U.S. Appl. No. 12/333,124, filed Dec. 11, 2008, issued Feb. 28, 2012 as U.S. Pat. No. 8,126,881 B1.
File History and the references cited therein of U.S. Appl. No. 13/357,538, filed Jan. 24, 2012, issued Feb. 12, 2013 as U.S. Pat. No. 8,375,037 B2.
File History and the references cited therein of U.S. Appl. No. 13/357,540, filed Jan. 24, 2012, issued Dec. 4, 2012 as U.S. Pat. No. 8,326,845 B2.
File History and the references cited therein of U.S. Appl. No. 13/664,268, filed Oct. 30, 2012, issued Oct. 21, 2014 as U.S. Pat. No. 8,868,572 B2.
File History and the references cited therein of U.S. Appl. No. 13/927,513, filed Jun. 26, 2013, issued Aug. 11, 2015 as U.S. Pat. No. 9,104,718 B1.
File History and the references cited therein of U.S. Appl. No. 14/486,993, filed Sep. 15, 2014, issued Oct. 24, 2017 as U.S. Pat. No. 9,799,000 B2.
File History and the references cited therein of U.S. Appl. No. 14/566,402, filed Dec. 10, 2014, issued Nov. 13, 2018 as U.S. Pat. No. 10,127,596 B1.
File History and the references cited therein of U.S. Appl. No. 14/790,552, filed Jul. 2, 2015, issued Apr. 26, 2016 as U.S. Pat. No. 9,324,104 B1.
File History and the references cited therein of U.S. Appl. No. 14/795,809, filed Jul. 9, 2015, issued Jun. 26, 2018 as U.S. Pat. No. 10,007,946 B1.
File History and the references cited therein of U.S. Appl. No. 15/076,468, filed Mar. 21, 2016, issued Jul. 18, 2017 as U.S. Pat. No. 9,710,843 B2.
File History and the references cited therein of U.S. Appl. No. 15/617,927, filed Jun. 8, 2017, issued May 5, 2020 as U.S. Pat. No. 10,643,265 B2.
File History and the references cited therein of U.S. Appl. No. 15/706,414, filed Sep. 15, 2017, issued Oct. 30, 2018 as U.S. Pat. No. 10,115,074 B1.
File History and the references cited therein of U.S. Appl. No. 16/138,796, filed Sep. 21, 2018, issued Mar. 8, 2022 as U.S. Pat. No. 11,270,252 B1.
File History and the references cited therein of U.S. Appl. No. 16/153,129, filed Oct. 5, 2018, issued Mar. 30, 2021 as U.S. Pat. No. 10,963,942 B1.
File History and the references cited therein of U.S. Appl. No. 16/836,608, filed Mar. 31, 2020, issued Sep. 21, 2021 as U.S. Pat. No. 11,127,067 B1.
File History and the references cited therein of U.S. Appl. No. 17/443,058, filed Jul. 20, 2021, issued Jun. 11, 2024 as U.S. Pat. No. 12,008,626 B1.
File History and the references cited therein of U.S. Appl. No. 17/445,458, filed Aug. 19, 2021, issued Nov. 12, 2024 as U.S. Pat. No. 12,141,854 B1.
File History and the references cited therein of U.S. Appl. No. 17/581,742, filed Jan. 21, 2022, issued Sep. 12, 2023 as U.S. Pat. No. 11,755,598 B1.
File History and the references cited therein of U.S. Appl. No. 18/652,791, filed May 1, 2024, published Jan. 2, 2025 as U.S. Publication No. 2025-0005645 A1.
File History and the references cited therein of U.S. Appl. No. 18/910,447, filed Oct. 9, 2024, published May 8, 2025 as U.S. Publication No. 2025-0148522 A1.
File History of U.S. Appl. No. 61/774,477, filed Mar. 7, 2013.
File History of U.S. Appl. No. 61/013,198, filed Dec. 12, 2007.
File History of U.S. Appl. No. 61/774,325, filed Mar. 7, 2013.
File History of U.S. Appl. No. 61/779,033, filed Mar. 13, 2013.
File History of U.S. Appl. No. 61/914,206, filed Dec. 10, 2013.
File History of U.S. Appl. No. 61/955,467, filed Mar. 19, 2014.
File History of U.S. Appl. No. 62/015,970, filed Jun. 23, 2014.
File History of U.S. Appl. No. 62/022,567, filed Jul. 9, 2014.
Ghose, Anindya, Panagiotis G. Ipeirotis, and Beibei Li. "Examining the Impact of Search Engine Ranking and Personalization on Consumer Behavior: Combining Bayesian Modeling with Randomized Field Experiments." Workshop of Information Systems Economics. 2011.
Intelligent product search with soft-boundary preference relaxation. Maciej Dabrowski, Thomas Acton, Hans van der Heijden. Expert Systems with Applications. vol. 39, Issue 9. 2012. https://doi.org/10.1016/j.eswa.2012.01.144. (Year: 2012).
Kim, Young-Sang et al.; Robust design of multilayer feedforward neural networks: an experimental approach; Engineering Applications of Artificial Intelligence, vol. 17, Is. 3; Apr. 2004; pp. 249-263; https://www.sciencedirect.com/science/article/pii/S095219760300157X (Year: 2004).
Sherrick, Susan, "An Introduction to Graphical User Interfaces and Their Use by CITIS", U.S. Department of Commerce Technology Administration National Institute of Standards and Technology, 1992, Total Pages: 24 (Year: 1992).
File History and the references cited therein of U.S. Appl. No. 13/938,045, filed Jul. 9, 2013.
File History and the references cited therein of U.S. Appl. No. 15/601,249, filed May 22, 2017, issued Dec. 18, 2018 as U.S. Pat. No. 10,157,231 B1.
Z. Gantner, L. Drumond, C. Freudenthaler, S. Rendle and L. Schmidt-Thieme, "Learning Attribute-to-Feature Mappings for Cold-Start Recommendations," 2010 IEEE International Conference on

(56) References Cited

OTHER PUBLICATIONS

Data Mining, Sydney, NSW, Australia, 2010, pp. 176-185, doi: 10.1109/ICDM.2010.129. (Year: 2010).

File History and the references cited therein of U.S. Appl. No. 18/448,900, filed Aug. 11, 2023, published Feb. 8, 2024 as U.S. Publication No. 2024-0046209 A1.

File History and the references cited therein of U.S. Appl. No. 13/924,375, filed Jun. 21, 2013, issued Oct. 11, 2016 as U.S. Pat. No. 9,465,873 B1.

File History and the references cited therein of U.S. Appl. No. 15/253,007, filed Aug. 31, 2016, issued Jun. 27, 2017 as U.S. Pat. No. 9,690,857 B1.

* cited by examiner

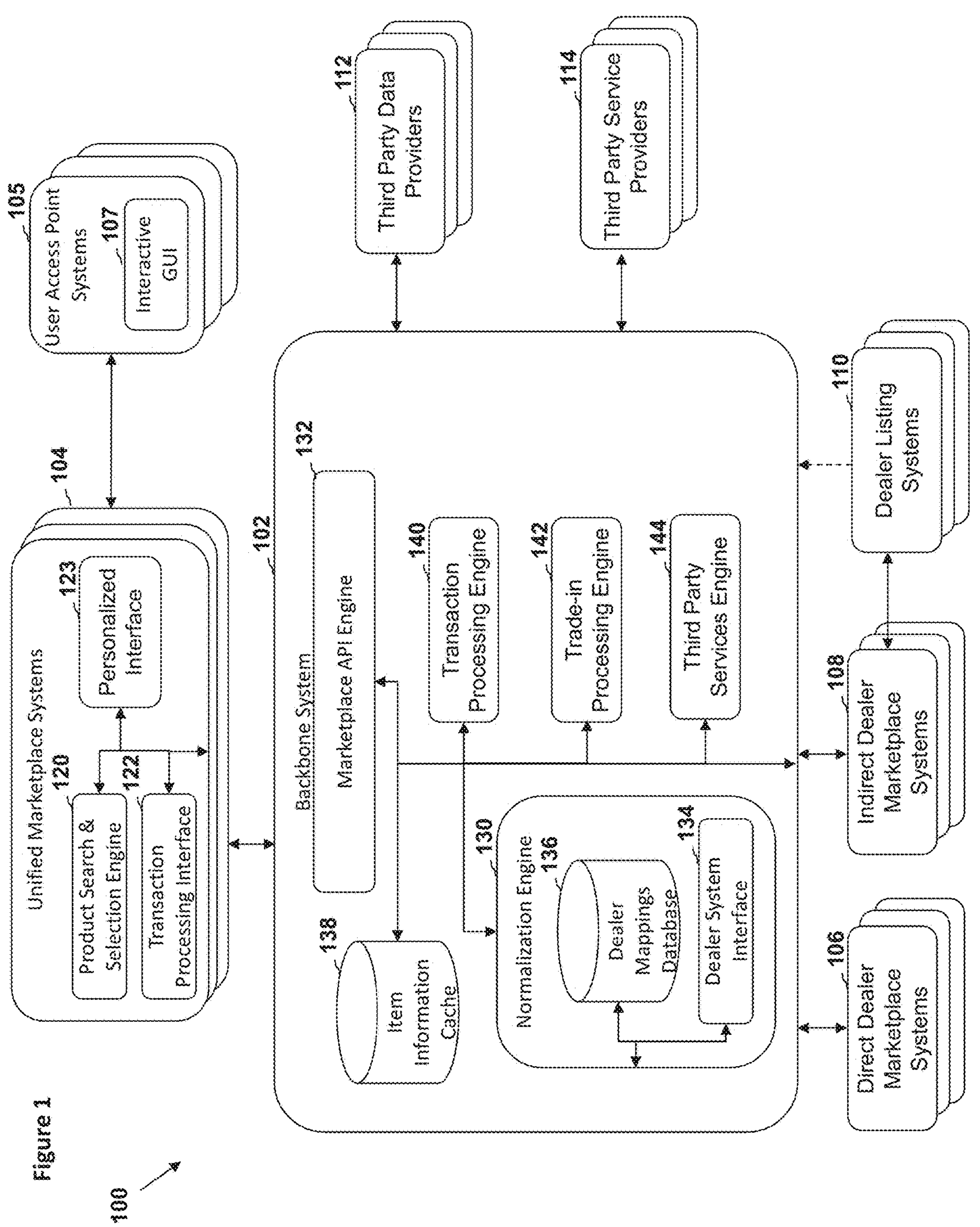
Figure 1
100
104
Unified Marketplace Systems
120
Product Search & Selection Engine
122
Transaction Processing Interface
123
Personalized Interface
105
User Access Point Systems
107
Interactive GUI
102
Backbone System
132
Marketplace API Engine
138
Item Information Cache
130
Normalization Engine
136
Dealer Mappings Database
134
Dealer System Interface
140
Transaction Processing Engine
142
Trade-in Processing Engine
144
Third Party Services Engine
112
Third Party Data Providers
114
Third Party Service Providers
110
Dealer Listing Systems
108
Indirect Dealer Marketplace Systems
106
Direct Dealer Marketplace Systems

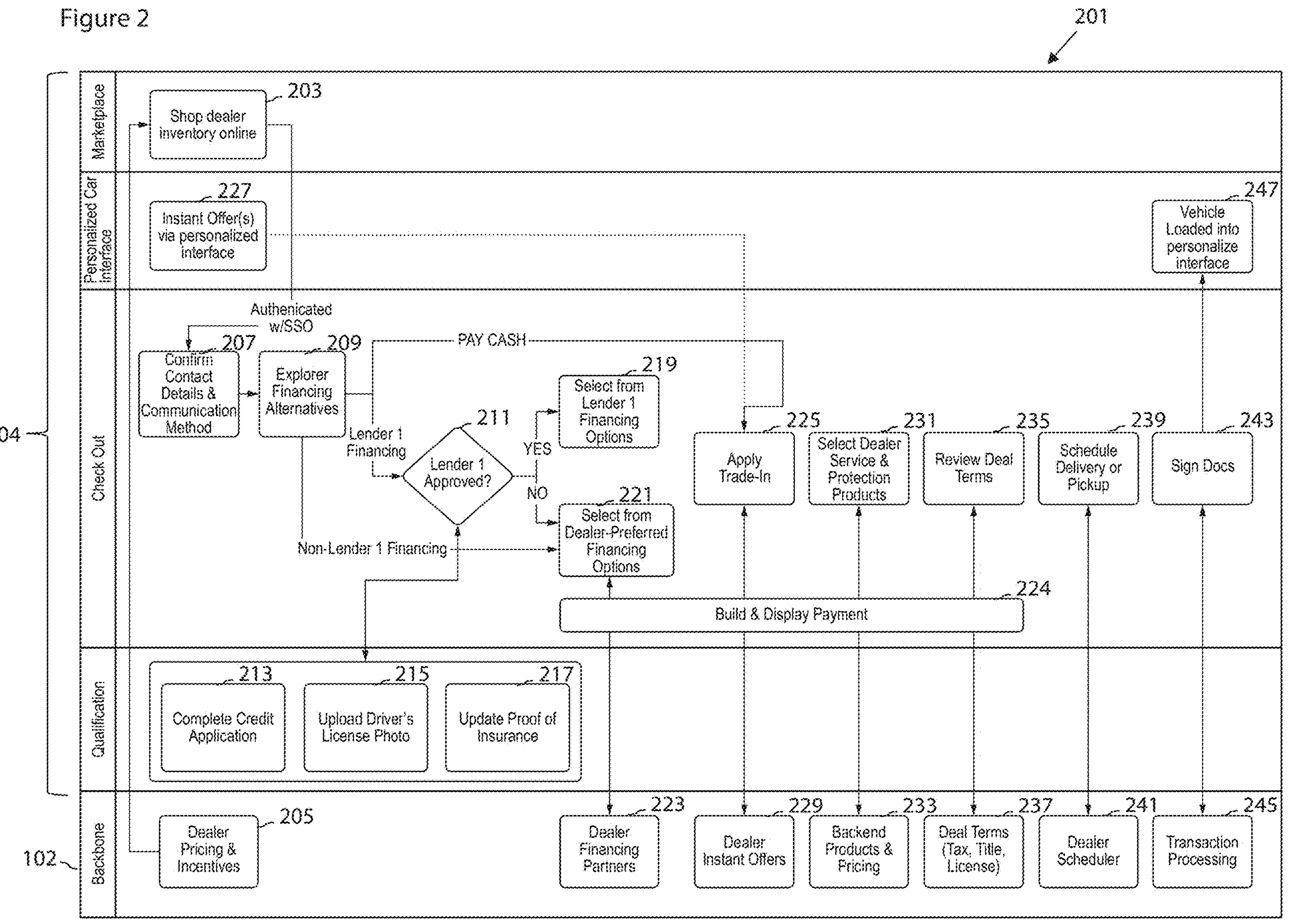
Figure 2
201
104
102
Marketplace
Personalized Car Interface
Check Out
Qualification
Backbone
Shop dealer inventory online
203
Instant Offer(s) via personalized interface
227
Vehicle Loaded into personalize interface
247
Authenicated w/SSO
Confirm Contact Details & Communication Method
207
Explorer Financing Alternatives
209
PAY CASH
Lender 1 Financing
Lender 1 Approved?
211
YES
NO
Select from Lender 1 Financing Options
219
Select from Dealer-Preferred Financing Options
221
Non-Lender 1 Financing
Apply Trade-In
225
Select Dealer Service & Protection Products
231
Review Deal Terms
235
Schedule Delivery or Pickup
239
Sign Docs
243
Build & Display Payment
224
Complete Credit Application
213
Upload Driver's License Photo
215
Update Proof of Insurance
217
Dealer Pricing & Incentives
205
Dealer Financing Partners
223
Dealer Instant Offers
229
Backend Products & Pricing
233
Deal Terms (Tax, Title, License)
237
Dealer Scheduler
241
Transaction Processing
245

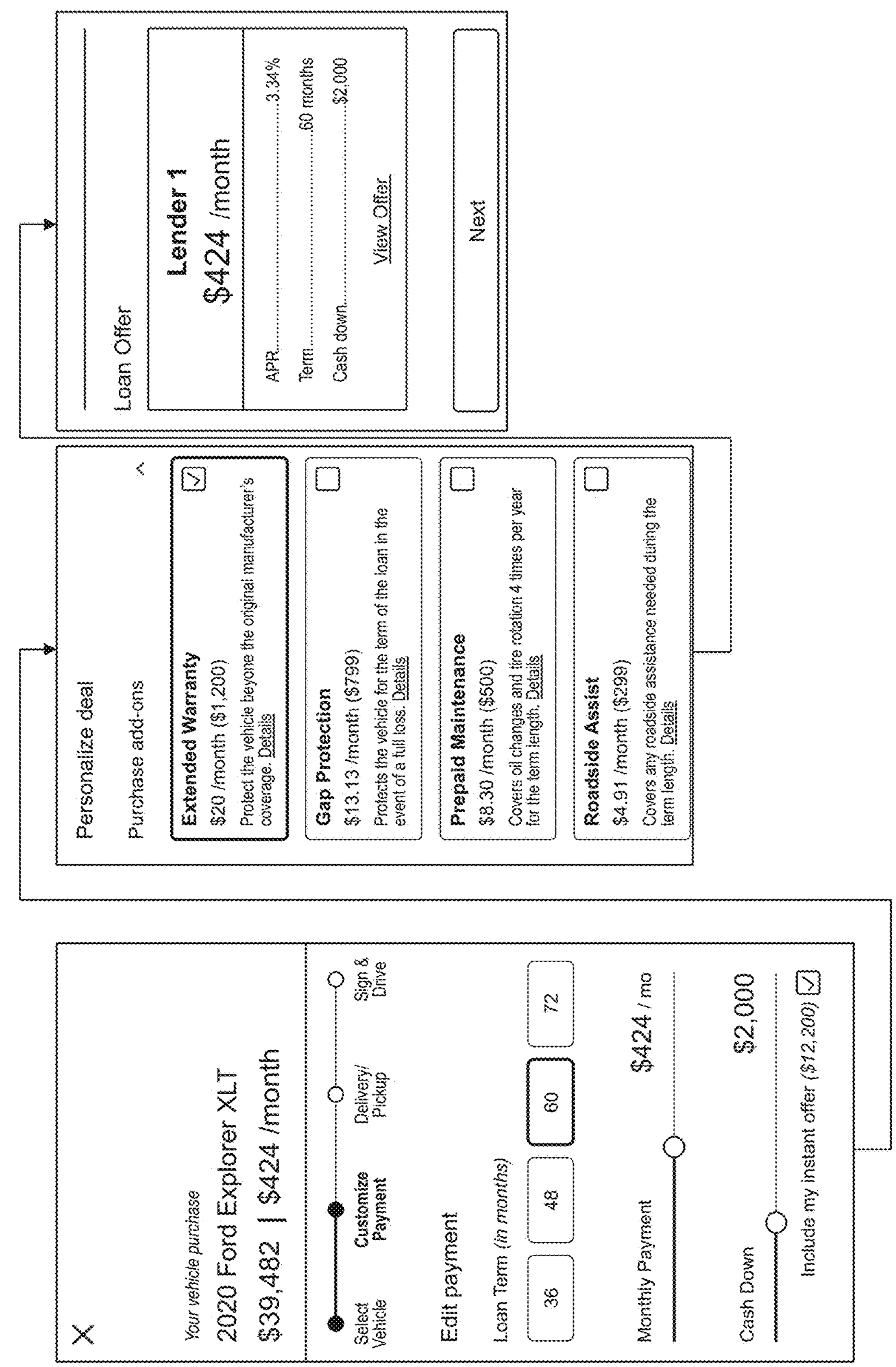
Figure 3B
Payment Customization (Lender 1 Financing)
Your vehicle purchase
2020 Ford Explorer XLT
$39,482 | $424 /month
Select Vehicle
Customize Payment
Delivery/ Pickup
Sign & Drive
Edit payment
Loan Term (in months)
36
48
60
72
Monthly Payment
$424 / mo
Cash Down
$2,000
Include my instant offer ($12,200)
Personalize deal
Purchase add-ons
Extended Warranty
$20 /month ($1,200)
Protect the vehicle beyond the original manufacturer's coverage. Details
Gap Protection
$13.13 /month ($799)
Protects the vehicle for the term of the loan in the event of a full loss. Details
Prepaid Maintenance
$8.30 /month ($500)
Covers oil changes and tire rotation 4 times per year for the term length. Details
Roadside Assist
$4.91 /month ($299)
Covers any roadside assistance needed during the term length. Details
Loan Offer
Lender 1
$424 /month
APR 3.34%
Term 60 months
Cash down $2,000
View Offer
Next 105
User Access Point Systems
107
Interactive GUI
400
123
120/122
424
104
Personalized Interface
eCommerce Marketplace
Concierge
102
Trade Value (ITO) 401
Pricing & Incentives 403
Back-end Product Selection 405
Pricing & Incentives 407
Transaction Processing 409
Schedule Pickup/ Delivery 411
108
Indirect Dealer Marketplace Systems
106
Direct Dealer Marketplace Systems
Dealers
110

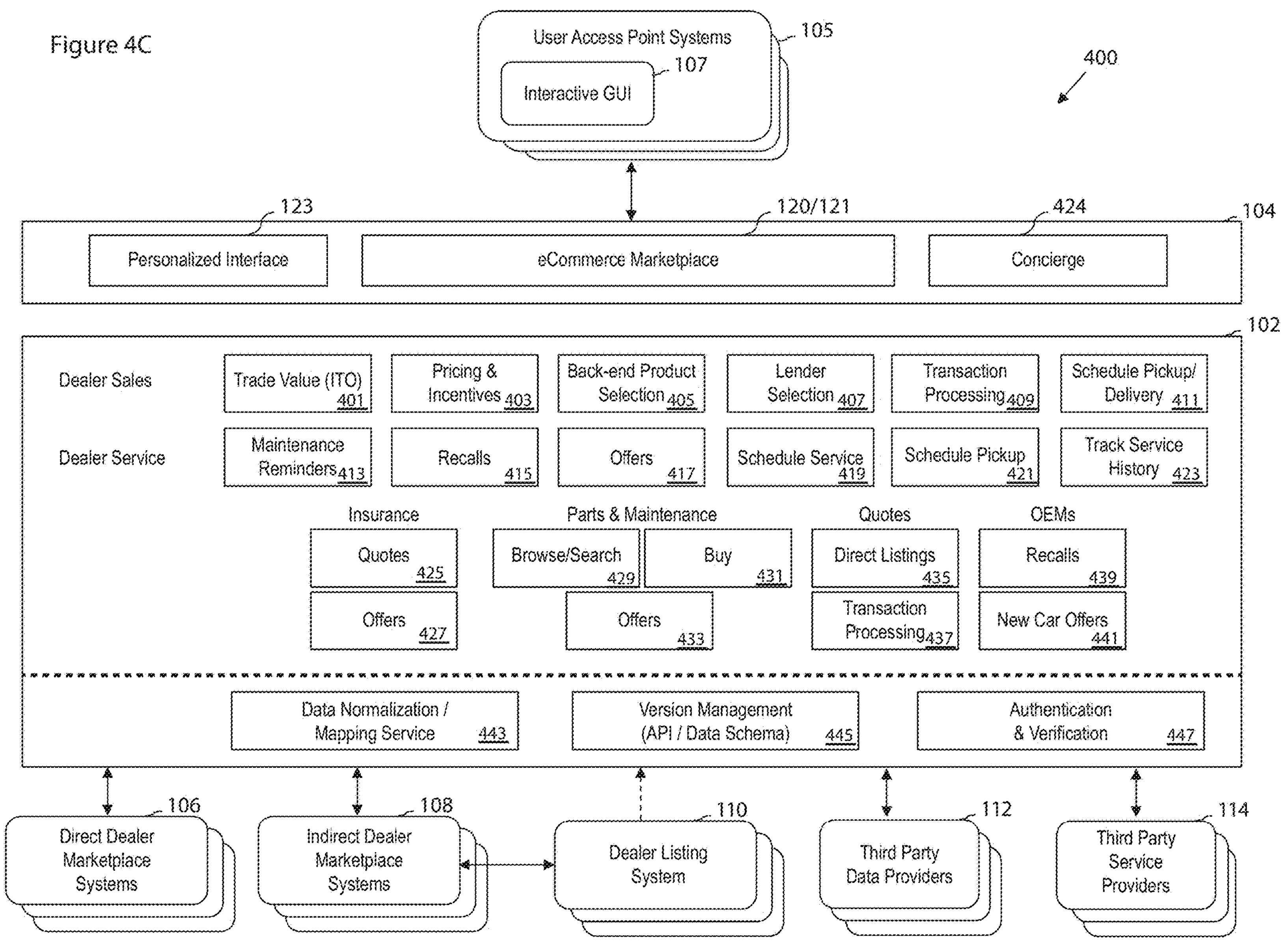
Figure 4C
User Access Point Systems
105
Interactive GUI
107
400
123
120/121
424
104
Personalized Interface
eCommerce Marketplace
Concierge
102
Dealer Sales
Trade Value (ITO) 401
Pricing & Incentives 403
Back-end Product Selection 405
Lender Selection 407
Transaction Processing 409
Schedule Pickup/ Delivery 411
Dealer Service
Maintenance Reminders 413
Recalls 415
Offers 417
Schedule Service 419
Schedule Pickup 421
Track Service History 423
Insurance
Parts & Maintenance
Quotes
OEMs
Quotes 425
Browse/Search 429
Buy 431
Direct Listings 435
Recalls 439
Offers 427
Offers 433
Transaction Processing 437
New Car Offers 441
Data Normalization / Mapping Service 443
Version Management (API / Data Schema) 445
Authentication & Verification 447
106
108
110
112
114
Direct Dealer Marketplace Systems
Indirect Dealer Marketplace Systems
Dealer Listing System
Third Party Data Providers
Third Party Service Providers

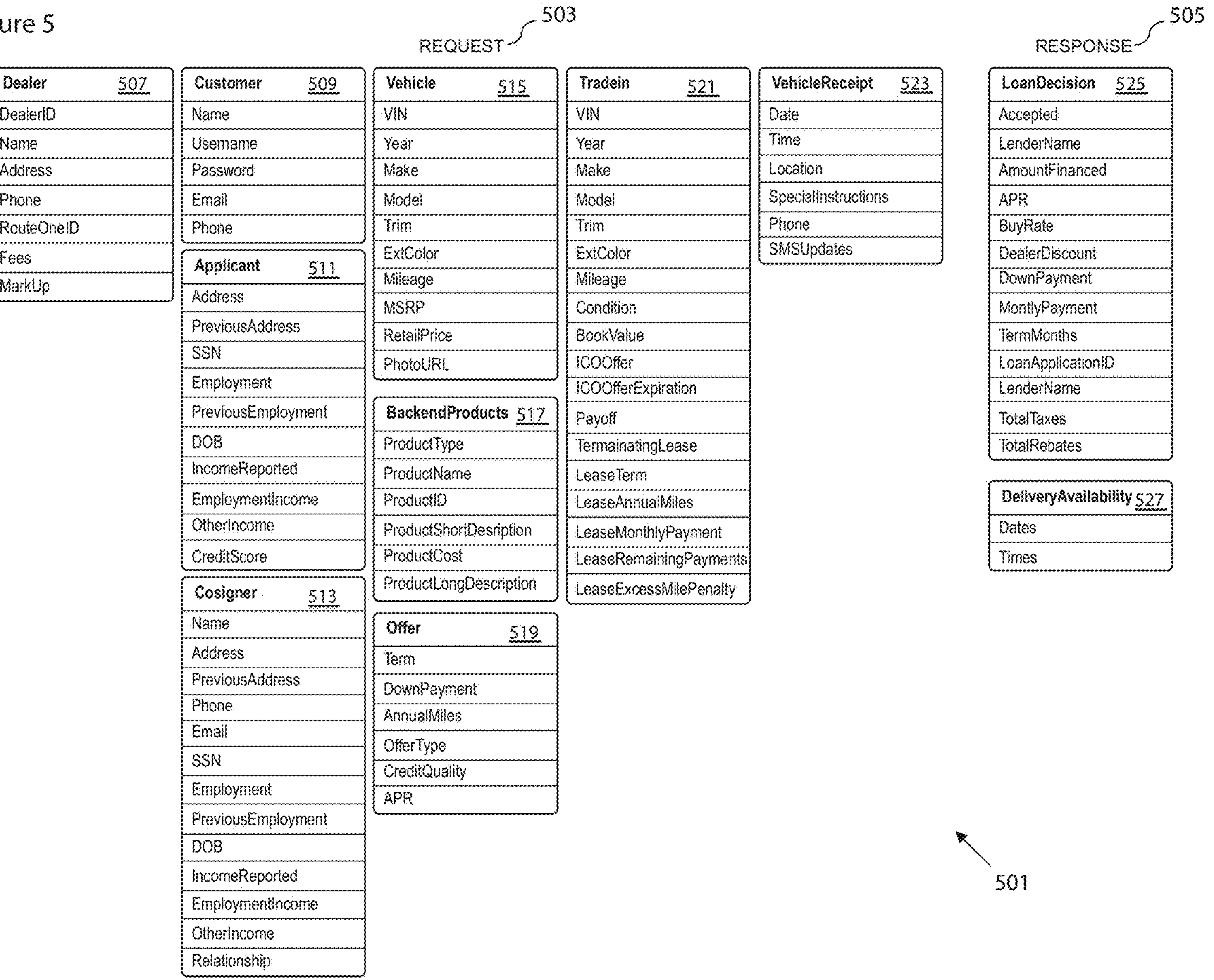
Figure 5
REQUEST
503
RESPONSE
505
Dealer 507
DealerID
Name
Address
Phone
RouteOneID
Fees
MarkUp
Customer 509
Name
Username
Password
Email
Phone
Applicant 511
Address
PreviousAddress
SSN
Employment
PreviousEmployment
DOB
IncomeReported
EmploymentIncome
OtherIncome
CreditScore
Cosigner 513
Name
Address
PreviousAddress
Phone
Email
SSN
Employment
PreviousEmployment
DOB
IncomeReported
EmploymentIncome
OtherIncome
Relationship
Vehicle 515
VIN
Year
Make
Model
Trim
ExtColor
Mileage
MSRP
RetailPrice
PhotoURL
BackendProducts 517
ProductType
ProductName
ProductID
ProductShortDesription
ProductCost
ProductLongDescription
Offer 519
Term
DownPayment
AnnualMiles
OfferType
CreditQuality
APR
Tradein 521
VIN
Year
Make
Model
Trim
ExtColor
Mileage
Condition
BookValue
ICOOffer
ICOOfferExpiration
Payoff
TermainatingLease
LeaseTerm
LeaseAnnualMiles
LeaseMonthlyPayment
LeaseRemainingPayments
LeaseExcessMilePenalty
VehicleReceipt 523
Date
Time
Location
SpecialInstructions
Phone
SMSUpdates
LoanDecision 525
Accepted
LenderName
AmountFinanced
APR
BuyRate
DealerDiscount
DownPayment
MontlyPayment
TermMonths
LoanApplicationID
LenderName
TotalTaxes
TotalRebates
DeliveryAvailability 527
Dates
Times
501

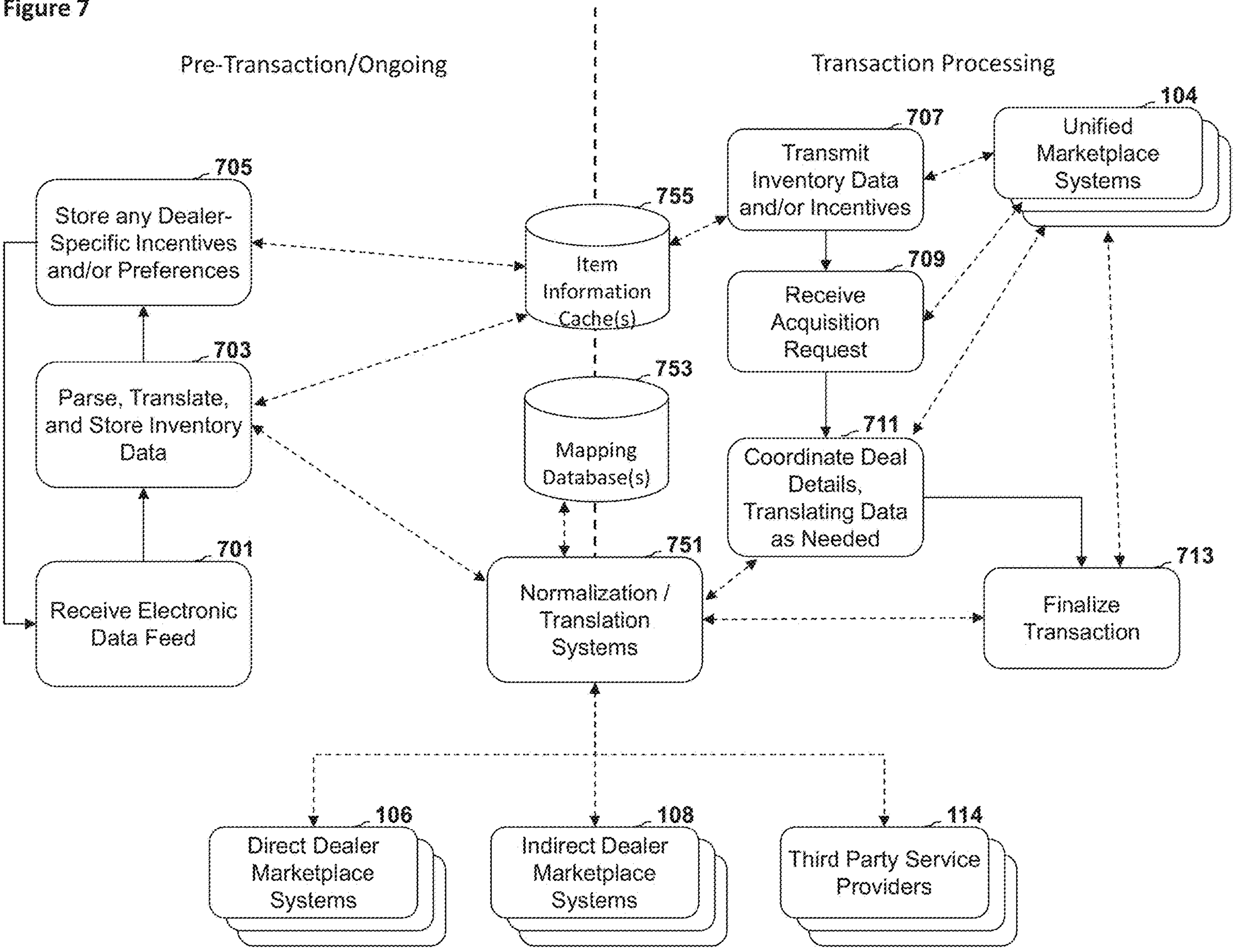
Figure 7
Pre-Transaction/Ongoing
Transaction Processing
705
Store any Dealer-Specific Incentives and/or Preferences
703
Parse, Translate, and Store Inventory Data
701
Receive Electronic Data Feed
755
Item Information Cache(s)
753
Mapping Database(s)
751
Normalization / Translation Systems
707
Transmit Inventory Data and/or Incentives
709
Receive Acquisition Request
711
Coordinate Deal Details, Translating Data as Needed
104
Unified Marketplace Systems
713
Finalize Transaction
106
Direct Dealer Marketplace Systems
108
Indirect Dealer Marketplace Systems
114
Third Party Service Providers

Figure 8A

Example Feed Mapping 1

Feed Source: DirectDealerMarketplaceSystem1 801
Feed Data Type: CSV

| Feed Field | Translation | Standardized Data Model Field 803 |
|---|---|---|
| 1 | = | Vehicle:Year |
| 2 | = | Vehicle:Make |
| 3 | a_b | a - Vehicle:Model<br>b - Vehicle:Trim |
| 4 | a_b_c | a - Vehicle:SubTrim<br>b - Vehicle:DriveType<br>c - Vehicle:BodyStyle |
| ⋮ | ⋮ | ⋮ |

Figure 8B

Example Feed Mapping 2

Feed Source: DirectDealerMarketplaceSystem2 801
Feed Data Type: TSV

| Feed Field | Translation | Standardized Data Model Field 803 |
|---|---|---|
| 1 | a_b | a - Vehicle:Year<br>b - Vehicle:Make |
| 2 | a_b | a - Vehicle:Model<br>b - Vehicle:Trim |
| 3 | round(2) | Vehicle:RetailPrice |
| 4 | round(0) | Vehicle:Mileage |
| ⋮ | ⋮ | ⋮ |

Figure 9A

Example Transaction Mapping 1

Third Party System: DirectDealerMarketplaceSystem1 801
Communication Protocol: API-REST

| Third Party API Field | Translation | Standardized Data Model Field 803 |
|---|---|---|
| vehicleIdentifier | = | Vehicle:VIN |
| buyerName | = | Customer:Name |
| a - deliveryDate1<br>b - deliveryDate2 | a,b | DeliveryAvailability:Dates |
| a - deliveryTime1<br>b - deliveryTime2 | a,b | DeliveryAvailability:Times |
| ⋮ | ⋮ | ⋮ |

Figure 9B

Example Transaction Mapping 2

Third Party System: InsuranceProvider1 801
Communication Type: API-SOAP

| Third Party API Field | Translation | Standardized Data Model Field 803 |
|---|---|---|
| vin | = | Vehicle:VIN |
| purchaser | = | Customer:Name |
| rate | = | BackendProducts:ProductCost |
| a - compDeductible<br>b - collDeductible | a,b | BackendProducts:Deductibles |
| ⋮ | ⋮ | ⋮ |

SYSTEMS, METHODS, AND DEVICES FOR UNIFIED E-COMMERCE PLATFORMS FOR UNIQUE ITEMS

CROSS-REFERENCE TO RELATED APPLICATIONS

This application is a continuation of U.S. patent application Ser. No. 17/443,127, filed Jul. 21, 2021, which claims the benefit of U.S. Provisional Application No. 63/056,381, titled SYSTEMS, METHODS, AND DEVICES FOR UNIFIED E-COMMERCE PLATFORMS FOR UNIQUE ITEMS, filed on Jul. 24, 2020, which is hereby incorporated by reference herein in its entirety.

FIELD

The disclosure relates generally to the field of e-commerce for unique items, and more particularly, to systems, methods, and devices for unified e-commerce platforms for unique items.

SUMMARY

The present disclosure presents various embodiments of systems that can efficiently integrate and present a unified marketplace for unique items, such as automobiles, that are offered for sale across a variety of fragmented listing systems. In some embodiments, the systems disclosed herein comprise an e-commerce backbone system that, among other things, acts as a translation layer or abstraction layer between a large number of separate vehicle listing systems and one or more unified marketplace systems. The unified marketplace systems can enable an end user to search for, obtain financing for, and/or purchase a vehicle listed for sale in one of the separate vehicle listing systems. The backbone system can communicate with the unified marketplace system, such as by presenting an API to the unified marketplace system, to enable the unified marketplace system to process such searching and transactions the same way for every transaction regardless of which underlying listing system is offering the vehicle for sale. Such a system can have a variety of benefits, including allowing users to search for, obtain financing for, purchase, and/or the like unique items through a single unified experience that is not otherwise possible.

According to some embodiments, an e-commerce backbone system for facilitating a unified marketplace for unique items comprises: a dealer system interface configured to communicate over a computer network with a plurality of dealer marketplace systems; a normalization engine configured to: translate data received from the plurality of dealer marketplace systems into data compliant with a standardized data model; and translate data sent to the plurality of dealer marketplace systems from data compliant with the standardized data model into data compliant with requirements of each individual dealer marketplace system; a dealer mappings database configured to store mappings that define translation methods for each individual dealer marketplace system; and a marketplace application programming interface (API) engine configured to present an API for sending and receiving data from one or more unified marketplace systems.

In some embodiments, the plurality of dealer marketplace systems comprises a plurality of direct dealer marketplace systems and a plurality of indirect dealer marketplace systems. In some embodiments, the system further comprises a third party services engine configured to communicate with a plurality of third party data systems and third party service provider systems.

According to some embodiments, an e-commerce backbone system for facilitating a unified marketplace for unique items comprises: a unified marketplace system interface configured to electronically communicate with one or more unified marketplace systems using a standardized data model; a unique items inventory database configured to store, in a format compatible with the standardized data model, data associated with a plurality of unique items listed for sale by a plurality of unique item dealers; a dealer mappings database configured to store mappings that define translations between the standardized data model and one or more dealer marketplace-specific data formats for each of a plurality of unique item dealer marketplace systems; a dealer marketplace system interface configured to communicate over a computer network with each of the plurality of unique item dealer marketplace systems in order to at least: receive a plurality of electronic feeds each comprising unique item inventory data related to at least a portion of the plurality of unique items listed for sale by the plurality of unique item dealers, wherein at least some of the plurality of electronic feeds comprise unique item inventory data encoded differently than at least some other of the plurality of electronic feeds; and transmit and receive data to and from each unique item dealer marketplace system in a format compatible with each unique item dealer marketplace system's one or more dealer marketplace-specific data formats to facilitate acquisition transactions between the one or more unified marketplace systems and the plurality of unique item dealers; a normalization engine configured to: translate the unique item inventory data of the received plurality of electronic feeds into data compliant with the standardized data model, wherein each translation uses a mapping stored in the dealer mappings database and associated with a dealer marketplace-specific data format; store the translated unique item inventory data in the unique item inventory database; and translate data received from and to be sent to the plurality of dealer marketplace systems, between data compliant with the standardized data model and data compliant with a dealer marketplace-specific data format for each unique item dealer marketplace system in facilitating the acquisition transactions, wherein each translation uses a mapping stored in the dealer mappings database and associated with a dealer marketplace-specific data format; and a transaction processing engine configured to: transmit unique item inventory data in a format compatible with the standardized data model to the one or more unified marketplace systems through the unified marketplace system interface, to enable the one or more unified marketplace systems to facilitate searching for and selection of an acquisition candidate unique item by a user; receive, from the one or more unified marketplace systems through the unified marketplace system interface, acquisition request data in a format compatible with the standardized data model, the acquisition request data indicative of a request by the user to acquire the acquisition candidate unique item, wherein the acquisition candidate unique item is associated with one of the plurality of unique item dealer marketplace systems; translate, using the normalization engine, at least a portion of the acquisition request data from the format compatible with the standardized data model to a format compatible with the one of the plurality of dealer marketplace systems; and transmit, to the one of the plurality of dealer marketplace systems through the dealer marketplace system interface, the translated at least a portion of the acquisition request data to facilitate processing of an acquisition transaction of the acquisition candidate unique item by the user.

In some embodiments, the plurality of unique item dealer marketplace systems comprises a plurality of direct unique item dealer marketplace systems and a plurality of indirect unique item dealer marketplace systems. In some embodiments, at least one of the plurality of unique item dealer marketplace systems is controlled by a third party. In some embodiments, the e-commerce backbone system further comprises: at least one of the one or more unified marketplace systems, wherein the at least one of the one or more unified marketplace systems is configured to present an interactive graphical user interface that facilitates the searching for and selection of the acquisition candidate unique item. In some embodiments, the unified marketplace system interface is configured to communicate over a computer network with at least some of the one or more unified marketplace systems. In some embodiments, at least one of the one or more unified marketplace systems is controlled by a third party. In some embodiments, the e-commerce backbone system further comprises: a third party services engine configured to communicate over a computer network with one or more third party service provider systems, to facilitate inclusion of one or more third party services in the acquisition transaction of the acquisition candidate item. In some embodiments, the one or more third party services comprises one or more of: a warranty service or an insurance service. In some embodiments, the plurality of unique items listed for sale comprises at least one of the following types of items: vehicles, used vehicles, or real estate. In some embodiments, each of the plurality of unique items listed for sale comprises a unique combination of attributes, the attributes comprising one or more of feature attributes, condition attributes, or location attributes. In some embodiments, the standardized data model includes a plurality of categories of data, the plurality of categories including at least dealer data, acquirer data, and unique item data. In some embodiments, the translating of the unique item inventory data of the received plurality of electronic feeds into data compliant with the standardized data model comprises at least: parsing a plurality of fields of data from an electronic feed; and separating at least some of the parsed data from a single field into multiple fields of the standardized data model. In some embodiments, the dealer mappings database is configured to store at least two different mappings for at least some of the plurality of unique item dealer marketplace systems, the at least two different mappings comprising a first mapping associated with electronic feed data, and a second mapping associate with facilitating acquisition transactions. In some embodiments, the different encoding of the at least some of the plurality of electronic feeds comprises at least one of the following: delimiting data fields differently, ordering data fields differently, using a different number of data fields to provide a same amount of data.

According to some embodiments, a computer-implemented method for facilitating a unified marketplace for unique items comprises: storing, in a dealer mappings database, mappings that define translations between a standardized data model and one or more dealer marketplace-specific data formats for each of a plurality of unique item dealer marketplace systems; receiving, by a computer system over a computer network, from the plurality of unique item dealer marketplace systems, a plurality of electronic feeds each comprising unique item inventory data related to at least a portion of a plurality of unique items listed for sale by a plurality of unique item dealers, wherein at least some of the plurality of electronic feeds comprise unique item inventory data encoded differently than at least some other of the plurality of electronic feeds; translating, by the computer system, the unique item inventory data of the received plurality of electronic feeds into data compliant with the standardized data model, wherein each translation uses a mapping stored in the dealer mappings database and associated with a dealer marketplace-specific data format; storing, in a unique item inventory database, the translated unique item inventory data; transmitting at least a portion of the stored unique item inventory data to one or more unified marketplace systems, to enable the one or more unified marketplace systems to facilitate searching for and selection of an acquisition candidate unique item by a user; receiving, from the one or more unified marketplace systems, acquisition request data in a format compatible with the standardized data model, the acquisition request data indicative of a request by the user to acquire the acquisition candidate unique item, wherein the acquisition candidate unique item is associated with one of the plurality of unique item dealer marketplace systems; translating, by the computer system, at least a portion of the acquisition request data from the format compatible with the standardized data model to a format compatible with the one of the plurality of dealer marketplace systems; and transmitting, by the computer system over a computer network to the one of the plurality of dealer marketplace systems, the translated at least a portion of the acquisition request data to facilitate processing of an acquisition transaction of the acquisition candidate unique item by the user, wherein the computer system comprises one or more hardware computer processors in communication with one or more computer readable storage devices.

In some embodiments, the plurality of unique item dealer marketplace systems comprises a plurality of direct unique item dealer marketplace systems and a plurality of indirect unique item dealer marketplace systems. In some embodiments, at least one of the plurality of unique item dealer marketplace systems is controlled by a third party. In some embodiments, the method further comprises: presenting, by at least one of the one or more unified marketplace systems, an interactive graphical user interface that facilitates the searching for and selection of the acquisition candidate unique item. In some embodiments, the transmitting to the one or more unified marketplace systems and the receiving from the one or more unified marketplace systems occurs over a computer network. In some embodiments, at least one of the one or more unified marketplace systems is controlled by a third party. In some embodiments, the method further comprises: communicating, by the computer system over a computer network, with one or more third party service provider systems, to facilitate inclusion of one or more third party services in the acquisition transaction of the acquisition candidate item. In some embodiments, the one or more third party services comprises one or more of: a warranty service or an insurance service. In some embodiments, the plurality of unique items listed for sale comprises at least one of the following types of items: vehicles, used vehicles, or real estate. In some embodiments, each of the plurality of unique items listed for sale comprises a unique combination of attributes, the attributes comprising one or more of feature attributes, condition attributes, or location attributes. In some embodiments, the standardized data model includes a plurality of categories of data, the plurality of categories including at least dealer data, acquirer data, and unique item data. In some embodiments, the translating of the unique item inventory data of the received plurality of electronic feeds into data compliant with the standardized data model comprises at least: parsing a plurality of fields of data from an electronic feed; and separating at least some of the parsed data from a single field into multiple fields of the standardized data model. In some embodiments, the dealer mappings database is configured to store at least two different mappings for at least some of the plurality of unique item dealer marketplace systems, the at least two different mappings comprising a first mapping associated with electronic feed data, and a second mapping associate with facilitating acquisition transactions. In some embodiments, the different encoding of the at least some of the plurality of electronic feeds comprises at least one of the following: delimiting data fields differently, ordering data fields differently, using a different number of data fields to provide a same amount of data.

According to some embodiments, an e-commerce backbone system for facilitating a unified marketplace for unique items comprises: a unique item listing system interface configured to communicate over a computer network with a plurality of unique item marketplace systems each listing a different set of unique items for sale; a normalization engine configured to: translate data received from the plurality of unique item marketplace systems into data compliant with a standardized data model; and translate data to be sent to the plurality of unique item marketplace systems from data compliant with the standardized data model into data compliant with requirements of each individual unique item marketplace system; a marketplace systems mappings database configured to store mappings that define translation methods for each individual unique item marketplace system; and a unified marketplace system interface configured to electronically communicate with one or more unified marketplace systems using data compliant with the standardized data model, to enable each of the one or more unified marketplace systems to facilitate unique item acquisition transactions by: enabling a user to search for and select an acquisition candidate unique item within a set of candidate unique items that spans the inventory of multiple of the plurality of unique item marketplace systems; and initiating the unique item acquisition transaction by transmitting transaction data to the unified marketplace system interface using the standardized data model, wherein the unique item listing system interface is further configured to communicate with one of the plurality of unique item marketplace systems that is associated with the acquisition candidate item, using at least a portion of the transaction data, translated by the normalization engine, to process the unique item acquisition transaction.

In some embodiments, the system further comprises at least one of the one or more unified marketplace systems. In some embodiments, the plurality of unique item marketplace systems comprises a plurality of direct dealer marketplace systems and a plurality of indirect dealer marketplace systems. In some embodiments, the system further comprises a third party services engine configured to communicate with a plurality of third party data systems and a plurality of third party service provider systems. In some embodiments, the plurality of third party service provider systems comprises one or more of: a warranty provider system or an insurance provider system. In some embodiments, at least one of the plurality of unique item marketplace systems is controlled by a third party. In some embodiments, the system further comprises: at least one of the one or more unified marketplace systems, wherein the at least one of the one or more unified marketplace systems is configured to present an interactive graphical user interface that facilitates the searching for and selection of the acquisition candidate unique item. In some embodiments, the unified marketplace system interface is configured to communicate over a computer network with at least some of the one or more unified marketplace systems. In some embodiments, at least one of the one or more unified marketplace systems is controlled by a third party. In some embodiments, each of the different sets of unique items listed for sale comprises at least one of the following types of items: vehicles, used vehicles, or real estate. In some embodiments, each unique item of the different sets of unique items listed for sale comprises a unique combination of attributes, the attributes comprising one or more of feature attributes, condition attributes, or location attributes. In some embodiments, the standardized data model includes a plurality of categories of data, the plurality of categories including at least dealer data, acquirer data, and unique item data. In some embodiments, the translating of data received from the plurality of unique item marketplace systems into data compliant with the standardized data model comprises at least: parsing a plurality of fields of data; and separating at least some of the parsed data from a single field into multiple fields of the standardized data model. In some embodiments, the marketplace systems mappings database is configured to store at least two different mappings for at least some of the unique item marketplace systems, the at least two different mappings comprising a first mapping associated with electronic feed data, and a second mapping associate with facilitating acquisition transactions. In some embodiments, the unique item listing system interface is configured to receive a plurality of electronic feeds each comprising unique item inventory data related to at least a portion of the different sets of unique items for sale, wherein at least some of the plurality of electronic feeds comprise unique item inventory data encoded differently than at least some other of the plurality of electronic feeds, and wherein the normalization engine is configured to translate the unique item inventory data of the received plurality of electronic feeds into data compliant with the standardized data model. In some embodiments, the different encoding of the at least some of the plurality of electronic feeds comprises at least one of the following: delimiting data fields differently, ordering data fields differently, using a different number of data fields to provide a same amount of data.

BRIEF DESCRIPTION OF THE DRAWINGS

Various embodiments will be described hereinafter with reference to the accompanying drawings. These embodiments are illustrated and described by example only, and are not intended to limit the scope of the disclosure. In the drawings, similar elements have similar reference numerals.

FIG. 1 is an embodiment of a block diagram depicting a unified e-commerce system for unique items.

FIG. 2 depicts an embodiment of a process flow diagram illustrating an example vehicle purchase process using a unified e-commerce system for unique items.

FIGS. 3A-3D depict example embodiments of graphical user interfaces of a user access point system in use with a unified e-commerce system for unique items.

FIGS. 4A-4C are additional embodiments of block diagrams depicting unified e-commerce systems for unique items.

FIG. 5 depicts an embodiment of a data model that can be used with a unified e-commerce system for unique items.

FIG. 7 depicts an embodiment of a process flow diagram illustrating an example inventory management and transaction processing process using a unified e-commerce system for unique items.

FIGS. 8A-8B depict example embodiments of mappings that can be used for translating data between a data feed format and a standardized data model format.

FIGS. 9A-9B depict example embodiments of mappings that can be used for translating data between a third party system data format and a standardized data model format.

DETAILED DESCRIPTION

Figure 3A:
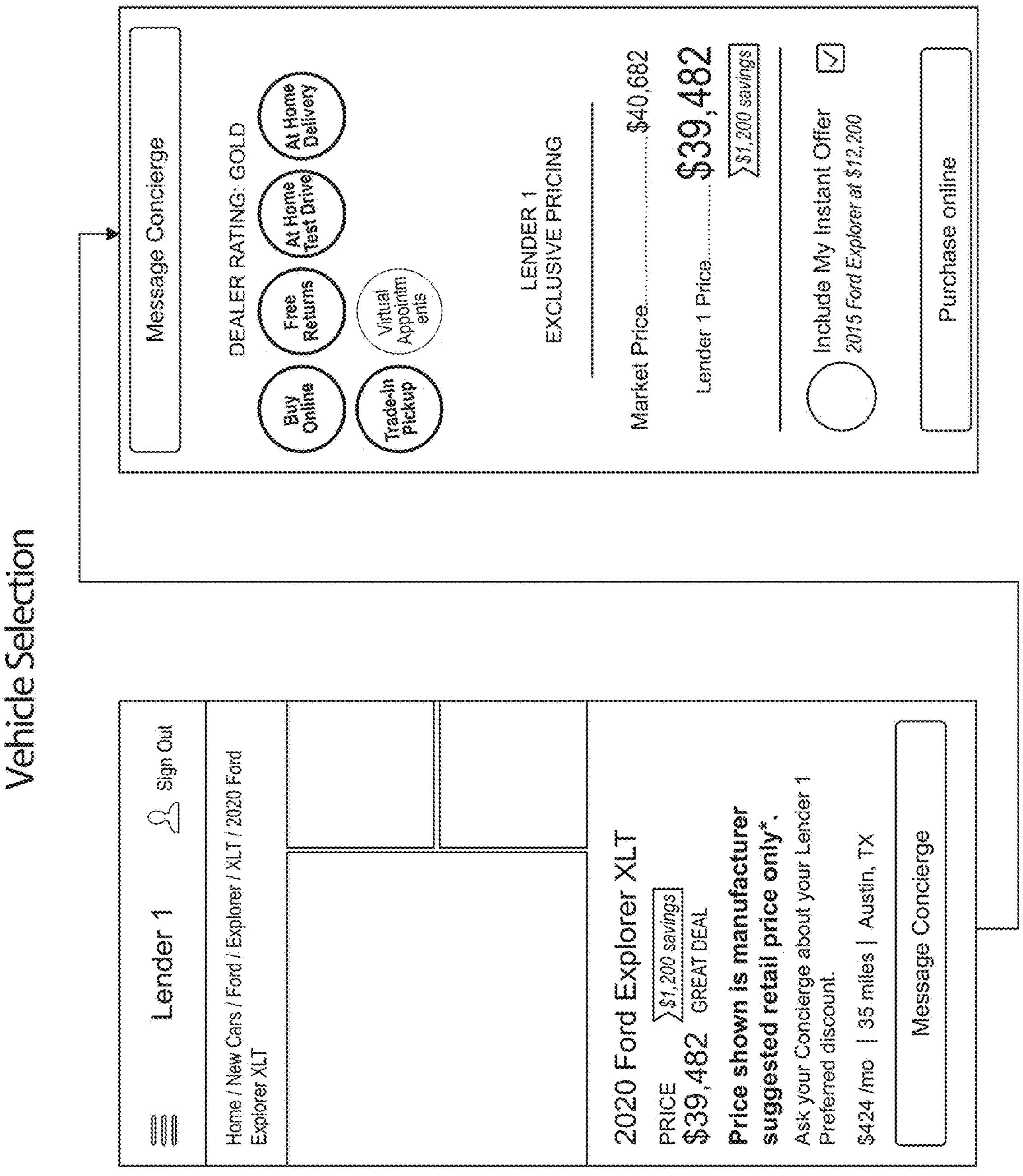

Although embodiments, examples, and illustrations are disclosed below the disclosure described herein extends beyond the specifically disclosed embodiments, examples, and illustrations and includes other uses of the disclosure and obvious modifications and equivalents thereof. Embodiments of the disclosure are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the disclosure. In addition, embodiments of the disclosure can comprise several novel features and no single feature is solely responsible for its desirable attributes or is essential to practicing the disclosures herein described.

E-commerce for vehicles is presently a very complex and fragmented market. Today there are approximately 15,000 franchise vehicle dealerships, 40,000 independent vehicle dealerships, at least 36 vendors that enable automotive dealers to support e-commerce on their websites, as well as many homegrown solutions for supporting e-commerce on automotive dealer websites. Each of these vendors has different interfacing requirements, and each defines different individual dealer pricing, add-on products, supported lenders, and the like. Further, each vendor has different methods for handling trade-ins and electronic paperwork. With such fragmentation in the market, it would be an overwhelming, if not impossible task, in the current state of the market for a company such as a lender to offer to its users a unified marketplace that allows for a seamless shopping experience of vehicles listed across all of these fragmented vendors. Such a marketplace would have to individually integrate with each vendor, with new ones that eventually show up, and to manage platform transitions whenever any of the vendors make changes. This creates a massive challenge to deliver a seamless shopping experience on top of all of this fragmentation.

The present disclosure presents solutions to these problems by, for example, providing a backbone middleware layer that abstracts away these single integration points and instead provides an open application programming interface (API) framework for any marketplace platform to integrate with. With such integrations in place, an e-commerce marketplace, such as a marketplace run by a particular lender, can create a unified customer experience independent of the underlying vendors. The backbone system can, through its open API framework, surface all of the individual dealer components, logic, and processes necessary to complete an e-commerce transaction just as if the consumer was natively using the dealer's website powered by one of the vendors. Further, the backbone systems disclosed herein can support the ability for the e-commerce marketplace to define lender preferences and fall back on other choices that dealers define if, for example, a user does not meet that lender's preferences.

The present disclosure presents various embodiments of systems that can efficiently integrate and present a unified marketplace for unique items, such as automobiles, that are offered for sale across a variety of fragmented listing systems. In some embodiments, the systems disclosed herein comprise an e-commerce backbone system that, among other things, acts as a translation or abstraction layer between a large number of separate dealer vehicle listing systems and one or more unified marketplace systems. The unified marketplace systems can enable an end user to search for, obtain financing for, and/or purchase a vehicle listed for sale in one of the separate vehicle listing systems. The backbone system can present an API to the unified marketplace system that enables the unified marketplace system to process such searching and transactions the same way for every transaction regardless of which underlying dealer system is offering the vehicle for sale. Such a system can have a variety of benefits, including allowing users to search for, obtain financing for, purchase, and/or the like unique items through a single unified experience that is not otherwise possible.

Some embodiments of the systems disclosed herein also provide one or more additional benefits. For example, some embodiments enable enhanced data privacy by, for example, keeping any user data that is specific to a particular user with the unified marketplace system, and not disclosing such information to the backbone system, the various listing systems, other third-party providers, and/or the like, until such disclosure is required to complete a transaction and is authorized by the user. The configuration of various systems disclosed herein is such that financing, purchases, insurance offerings, and/or the like can be offered to users in a useful fashion without requiring the unified marketplace system to disclose the user's private information to the providers of those items until the user decides to move forward with conducting such a transaction.

Another benefit of various embodiments of the systems disclosed herein is that the backbone system can be configured to take into account various business- or transaction-related preferences of certain entities that are offering services, in order to, for example, allow multiple unified marketplace systems to utilize the backbone system even if each of those unified marketplace systems is run by a different entity having its own business and/or transaction preferences. For example, one type of entity that may run such a unified marketplace system is a bank or other lender. Because such an institution may already have a user's private information as a result of other banking relationships with the user, it can be beneficial to have such an institution run the unified marketplace system, such as to limit distribution of such private customer data to other companies. Accordingly, an entity such as a bank or other lender can provide additional valuable services to a user, such as enabling the user to search for, obtain lending for, and complete the transaction of purchasing a vehicle, while only disclosing the user's private information at an appropriate time in the transaction and only to the extent necessary to complete the transaction.

Another benefit of the systems disclosed herein is that some embodiments enable the backbone system to interface with one or more third-party service providers, such as automotive insurance providers, automotive warranty providers, automotive parts and maintenance providers, and/or the like. Such interfaces may, for example, enable the unified marketplace system to offer additional services along with and during the purchase transaction of a vehicle, such as insurance and extended warranties. Such interfaces may also, for example, enable the unified marketplace system to continue serving the user after a purchase has been completed. For example, the system may enable a user to coordinate future service of his or her vehicle, to order parts for his or her vehicle, to offer the vehicle for sale, and/or the like all through the original unified marketplace system.

Although various embodiments described herein are described with respect to vehicles, such as new and used vehicles, the techniques disclosed herein may also be used with various other types of unique items, such as real estate, housing, apartments, used goods, and/or the like. Vehicle sales is especially suited to application of the techniques disclosed herein, particularly due to the extreme fragmentation in current dealer listing systems. Further, although various embodiments described herein utilize the term “dealer” to refer to a system that is listing a unique item for sale, this term is not intended to require that the dealer be a formal vehicle dealership or the like. Rather, this term, when used in the context of a dealer marketplace system, is intended to refer to any system that is offering or listing a plurality of unique items for sale. This may include, for example, systems listing vehicles for sale, systems listing real estate for sale, systems listing houses for sale, and/or the like.

As used herein, the term “unique item” is intended to refer to a specific item listed for sale that is unique. As an example, in the context of vehicles, each item listed for sale will be unique at least due to its unique combination of attributes, which may include, for example, condition attributes, feature attributes, location attributes, listing attributes, and/or the like. For example, condition attributes may comprise one or more attributes describing the specific condition of a vehicle, such as mileage, whether the vehicle has been in an accident, a number of previous owners, and/or the like. As another example, feature attributes may comprise one or more attributes describing specific features of the vehicle, such as whether the vehicle has all-wheel-drive or not, whether a towing package is included, the color of the vehicle, and/or the like. As another example, location attributes may comprise one or more attributes relating to where the item is currently located, where it was originally sold, and/or the like. As another example, listing attributes may comprise one or more attributes describing attributes of the current listing, such as price, location, the dealer offering the vehicle, and/or the like. As another example, each vehicle may be associated with a unique vehicle identification number (VIN). In the context of real estate or housing, each item listed for sale will be unique at least due to its unique location or address, in addition to potentially various other unique attributes, such as various condition attributes, feature attributes, location attributes, listing attributes, and/or the like.

In the context of unique items, the fragmentation in the marketplace discussed above can be significantly more complicated to address than if, for example, a system were being used to aggregate listings of non-unique items across various listing systems (e.g., across various listing systems that are each listing the same non-unique item for sale, such as a new DVD, a new book, and/or the like, just from a different source). Further, various complications arise in the context of unique items, particularly when the unified marketplace systems disclosed herein may not be the only place those unique items are available for purchase. For example, the direct and indirect dealer marketplace systems may at any time sell or otherwise dispose of a unique item listed through their system through channels other than through the unified marketplace system disclosed herein. Accordingly, it can be beneficial for the systems disclosed herein to incorporate regular, ongoing, and/or real-time communications with the various dealer listing systems in order to more efficiently and accurately present a unified marketplace to users. In some embodiments, even though the systems disclosed herein may store or cache at least some inventory data to facilitate efficient searching and filtering, they can also be configured to communicate with the dealer listing systems in real time to check, supplement, and/or update the cached data as a user is interacting with the unified marketplace system to search for and select an acquisition candidate item.

Another benefit of unified marketplace e-commerce systems disclosed herein is that the unified marketplace presented to a user is far more than a simple aggregation of classified ads. For example, one potential solution to the fragmentation in the marketplace could be a classified ad aggregator that collects listing information from the various dealer marketplace systems and presents information about those listings in a unified fashion. Although such a system could potentially allow a user to search for an acquisition candidate across various dealer listing systems, the benefits to such a system would end there, because once a user decides they are interested in purchasing an item, they would need to be redirected to the individual dealer listing systems. The systems disclosed herein, on the other hand, desirably enable a unified e-commerce marketplace that can enable a user to search for, select, and purchase a unique item from across a number of listing systems, potentially along with one or more services associated with that unique item, such as a loan, insurance, a warranty, and/or the like.

Example Unified E-Commerce System for Unique Items

FIG. 1 illustrates an example embodiment of a block diagram of a unified e-commerce system for unique items 100. The system 100 comprises an e-commerce backbone system 102, one or more unified marketplace systems 104, and a plurality of user access point systems 105, direct dealer marketplaces systems 106, indirect dealer marketplace systems 108, dealer listing systems 110, third-party data providers 112, and third-party service providers 114. The unified e-commerce system 100 can be utilized to enable people that are in the market for a unique item to search for and find the unique item through a unified marketplace system that seamlessly presents unique items for sale across a variety of fragmented dealer marketplace systems.

In use, the user access point systems 105 may be, for example, a smart phone, a tablet computer, a personal computer, and/or the like that a person interacts with through an interactive GUI 107. The user access point systems 105 may communicate with one or more of the unified marketplace systems 104, such as over the Internet or another network. The unified marketplace systems 104 can comprise multiple components, such as a product search and selection engine 120, a transaction processing interface 122, and a personalized interface 123. The product search and selection engine 120 may, for example, enable a user access point system 105 to search for unique items, such as vehicles, that are currently offered for sale by the one or more dealer marketplace or dealer listing systems 106, 108, 110. When a user is ready to purchase the unique item, the transaction processing interface 122 of the unified marketplace system may be configured to communicate with the backbone system 102, such as via the marketplace API engine 132 of the backbone system 102, in order to complete the transaction. In some embodiments, the marketplace API engine 132 may be referred to as a unified marketplace system interface, an API interface, and/or the like.

In some embodiments, the unified marketplace system 104 may also comprise a personalized interface 123 that can be configured to, for example, present information to a user via the user access point system 105 related to existing unique items the person owns, is interested in, and/or the like. Such an interface may also allow the user to request additional services for an existing unique item they own, such as scheduling maintenance, obtaining a trade-in offer or sale offer, ordering parts for a vehicle, and/or the like.

With continued reference to FIG. 1, the e-commerce backbone system 102 comprises a variety of components that enable the backbone system 102 to communicate with a variety of other systems and translate data and requests between different systems. For example, the backbone system 102 comprises a normalization engine 130 that can be configured to translate between a standardized data model and the different or unique requirements of each dealer marketplace system 106, 108 and/or dealer listing system 110. The standardized data model may, for example, describe all the elements necessary to enable searching for a unique item, purchasing a unique item, financing a unique item, and/or the like. An example of such a standardized data model is describe below with reference to FIG. 5. The normalization engine 130 may be configured to map this standardized data model on to the specific requirements of each individual dealer system, and store such mappings in the dealer mappings database 136. The normalization engine 130 further comprises a dealer system interface 134 that can be configured to utilize the mappings stored in the dealer mappings database 136 to conduct the translation between the standardized data model and the requirements of each specific dealer system.

One reason such mappings are desirable is that each of the dealer marketplace systems and/or dealer listing systems 106, 108, 110 will typically present data related to its listings in a different format. For example, most vehicle dealers offer their inventory via third party inventory providers, such as the indirect dealer marketplace systems 108. These providers either collect the data manually from the dealers and digitize it, or access the dealer's DMS (Dealer Management System), where the information about their vehicles is recorded. The provider will in turn offer an electronic "feed" of this data, and the feeds offered by each of these third party inventory providers are typically in a format specific to each provider. The normalization engine 130 desirably provides a method for translating between the format of each specific feed provider and a standardized or normalized format, such as the data model illustrated in FIG. 5 and discussed in greater detail below.

As one specific example for a particular unique item, one dealer marketplace system may offer a listing for a 2015 Lexus RX 350 vehicle. This specific dealer marketplace system may present its feed of vehicle listings in comma separated value (CSV) format, where each listing is represented by a string of text that has values for different fields in a predetermined arrangement separated by commas. For example, a portion of the feed for this vehicle may be as follows: "2015", "Lexus", "RX 350", "F SPORT AWD 4dr SUV." In this case, the provider is presenting a comma separated value item that that includes four fields, including the vehicle year, the vehicle make, and two other fields. Such feed data can present some complications, however. For example, although some portions of the feed data, such as the vehicle year and make, may be relatively standard across various providers, other portions of the feed data, such as the other two fields, may not be standardized across the various providers. Accordingly, instead of merely directly mapping the four fields from this feed data into four items in a standardized or normalized data model (e.g., the data model of FIG. 5), the normalization engine 130 may be configured to parse the individual fields of the feed data and separate at least some of the fields into different fields of the normalized data model. For example, in some embodiments, the normalization engine 130 may map the above example of feed data into the following example standardized or normalized data: "year": 2015, "make": "Lexus", "model": "RX", "trim": "350", "subtrim": "F Sport", "driveType": "AWD", "bodyStyle": "SUV."

It should be noted that the standardized or normalized data model of FIG. 5 is merely an example, and may include more or fewer data fields. For example, the data model shown in FIG. 5 does not include the "subtrim," "driveType," or "bodyStyle" fields, but such fields may be included in the standardized data model in some embodiments, and/or may be included in a database used internally by the backbone system 102 but not necessarily presented to the unified marketplace systems 104 through the marketplace API engine 132. Even if such fields are not exposed to the unified marketplace systems 104 through the marketplace API engine 132, it can be desirable to maintain such fields in the backbone system 102 for other purposes. For example, as part of a vehicle purchase and/or trade-in transaction, the backbone system 102 may be configured to contact one or more of the third party data providers 112 to determine an estimated value of the vehicle being purchased or traded in. Examples of such third party data providers 112 included services offered under the names NADA®, KELLEY BLUE BOOK®, and BLACK BOOK®. In order to obtain the most accurate valuation of the vehicle, it may be necessary to transmit information to those third party data providers 112, such as the subtrim, driveType, bodyStyle, and/or the like fields, even though such information may not need to be transmitted to the unified marketplace systems 104. Further, each third party data provider 112 may require that such information be transmitted in a different format, similarly to how each dealer marketplace system presents feeds of its data in different formats. Accordingly, the backbone system 102 may be configured to translate such stored information into a format needed by the third party data providers 112. For example, with reference to the 2015 Lexus example given above, some of the third party data providers 112 may consider "F Sport" to be a trim of the vehicle, while other third party data providers 112 may consider "F sport" to be an optional package of the vehicle. The backbone system 102 may be configured to recognize such differences in third party data provider requirements, and map the relevant details onto such requirements when requesting information from the third party data providers 112.

One problem with trying to offer a unified marketplace that presents a plurality of unique items for sale across a variety of dealer marketplace systems is that there may be inconsistencies and/or duplicates present across the variety of dealer marketplace systems. In order to address this problem, in some embodiments, the normalization engine 130 and/or another portion of the backbone system 102 is configured to conduct a de-duplication process that can identify duplicate listings of unique items across the variety of dealer marketplace systems and determine or select a single, "best" listing for that unique item to present through the unified marketplace system 104. For example, the system may be configured to identify duplicate listings by comparing a unique feature, such as a vehicle identification number.

Once two or more duplicate listings have been identified, the system may be configured to apply one or more rules or logic in order to select the best listing to present through the unified marketplace systems 104. For example, the system may be configured to select the best listing based on features such as the age of the listing, the history of the listing, the history of the dealer or dealer marketplace system that is offering the listing, and/or the like. In some cases, duplicate listings may be errors. For example, if a first dealer transfers a vehicle to a second dealer, but the first dealer has not yet taken down their listing for the vehicle, duplicate listings may be present across the first and second dealer. In such a case, the system may be configured to present the newer listing at the second dealer through the unified marketplace systems 104. In other cases, however, duplicate listings may not necessarily be errors. For example, multiple indirect dealer marketplace systems 108 may include listings for the same vehicle at a particular dealer, with each of those listings at the indirect dealer marketplace systems 108 being a valid listing that could be used to facilitate a purchase of the vehicle. In such a case, the backbone system 102 may be configured to select the best listing based on a number of factors, such as price, location, preferences of the particular unified marketplace system 104 that is offering the listing, and/or the like. In some cases, different listings for the same vehicle may be presented through different unified marketplace systems 104 if, for example, different unified marketplace systems 104 have different preferences that result in the selection of a different listing of that vehicle to present. In some embodiments, the system may further be configured to select which listing of multiple listings for the same vehicle to present based at least partially on accuracy of those listings. For example, in some cases, the backbone system 102 may already know some or all of the details associated with a particular vehicle, and the system may be configured to compare those details to the details being presented by the dealer marketplace systems. If one of the duplicate listings for the vehicle contains more accurate details than another, then the more accurate listing may in some embodiments be chosen as the "best" listing to present through the unified marketplace systems 104.

Figure 4A:
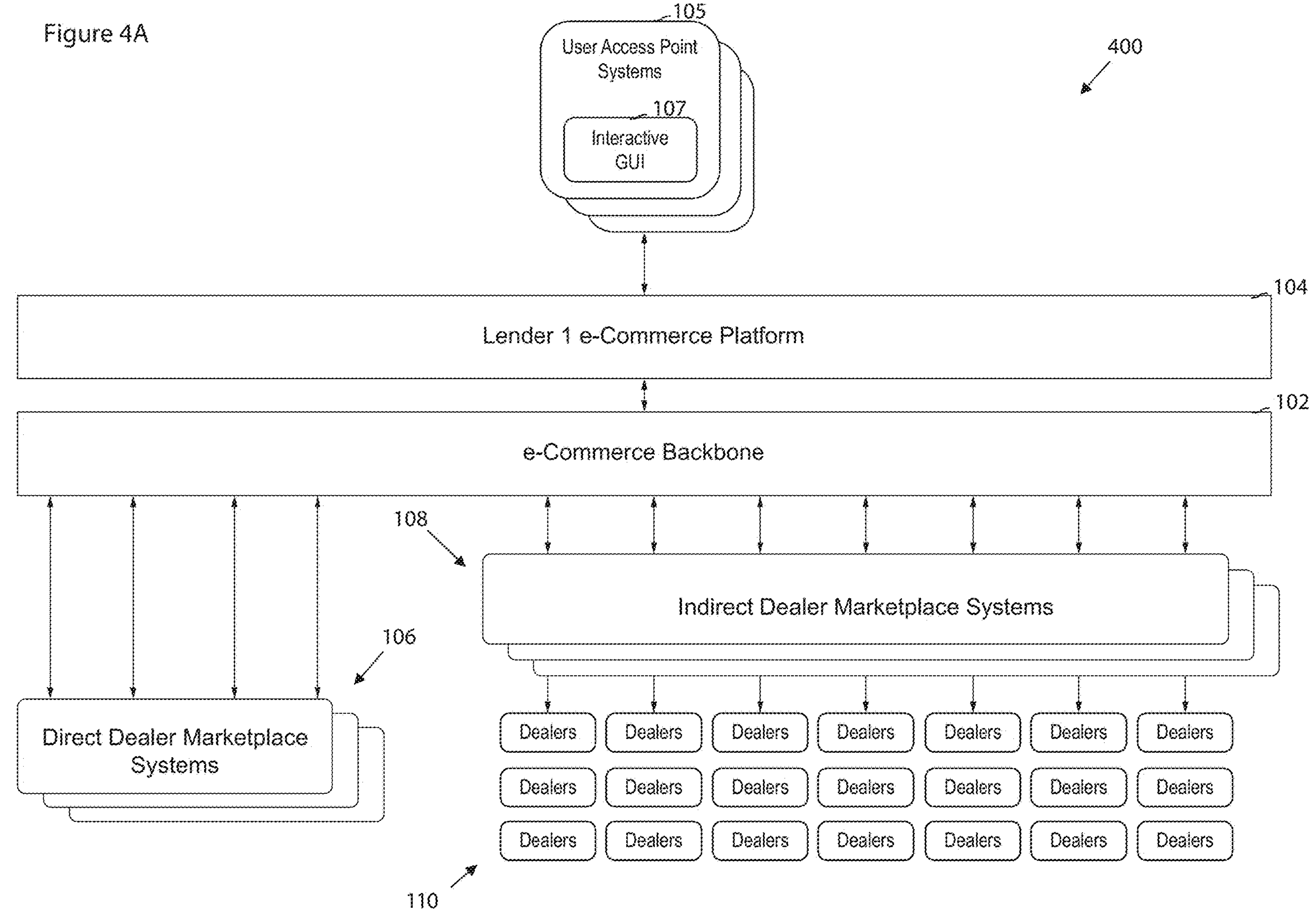

FIG. 1 further illustrates that the backbone system 102 can communicate with a plurality of direct dealer marketplace systems 106 and a plurality of indirect dealer marketplace systems 108. For example, a direct dealer marketplace system 106 may be a system that is provided directly by or for a specific automotive dealer to enable online sales of their vehicles. An indirect dealer marketplace system 108 may, on the other hand, be a system that is run by and provided by a third party separate from a vehicle dealer in order to enable online sales for such dealers. An example of this is illustrated in FIG. 4A, which shows a plurality of indirect dealer marketplace systems 108 between the e-commerce backbone 102 and a plurality of dealers 110.

Preferably, the backbone system 102 communicates directly with the direct dealer marketplace systems 106 and indirect dealer marketplace systems 108. This can be preferable, for example, because the direct and indirect dealer marketplace systems 106, 108 may already be set up to handle requests over a network, such as by each using their own API or other methods, in order to facilitate searching for and completing transactions of vehicle purchases. It is possible, however, for the backbone system 102 to also be configured to communicate directly with dealer listing systems 110, as indicated by the dashed line between the dealer listing systems 110 and backbone system 102 shown in FIG. 1. For example, even if a dealer listing system 110 is not set up to have an API or other method for searching for vehicles and/or completing transactions related to those vehicles, the backbone system 102 could be configured to at least obtain data from the dealer listing systems 110, such as by scraping their webpages with a web crawler and/or the like.

FIG. 1 shows that the backbone system 102 can also be configured to communicate over a network with a number of third party data providers 112 and third party service providers 114. For example, a third party data provider 112 may be a system that provides information to the backbone system 102 about vehicle histories, pricing trends, and/or the like that may assist the backbone system 102 in analyzing things like the expected value of a specific vehicle, the time a specific vehicle will take to sell, and/or the like. A third party service provider 114, on the other hand, may be a system that can offer services, such as financing, add-on services, and/or the like to a purchaser of a vehicle or other unique item. For example, third party service providers 114 may be car insurance companies, extended warranty companies, lenders or financing companies, aftermarket part or product companies, and/or the like.

In some embodiments, when a unified marketplace system 104 is communicating with the backbone system 102 to, for example, search for and display vehicles offered for sale across a plurality of dealer marketplace systems, the backbone system 102 may be configured to pass data between the unified marketplace systems 104 and the dealer marketplace systems 106, 108 in real time, but "translated" by the normalization engine 130 between the standardized data model and the specific requirements of each dealer marketplace system. It can be preferable, however, to store or cache at least some information about the items (e.g., the inventory) offered for sale by the dealer marketplace systems. This can be beneficial, for example, because it may enable faster and more seamless searching, sorting, filtering, and/or the like. For example, the item information cache database 138 of the backbone system 102 may store at least some details about the items offered for sale by the dealer marketplace systems, such as price, vehicle type, vehicle model, vehicle year, thumbnail photographs, and/or the like. By using such a cache, the backbone system 102 may be able to provide quicker search responses to search requests by the unified marketplace systems 104. The system may be configured, however, to still communicate with the dealer marketplace systems 106, 108 in order to provide additional details when, for example, a user is interested in more details of a particular listing. In some embodiments, the item information cache database 138 may be referred to as an inventory database.

As is further described below with reference to the vehicle financing and purchase process of FIG. 2, the backbone system 102 can be configured to not only facilitate searching for vehicles offered for sale across a plurality of fragmented dealer marketplace systems, but to also facilitate a fully or mostly online transaction to purchase one of those vehicles, finance one of those vehicles, purchase add-on services such as insurance and warranties, and/or the like. Such processes may be implemented by, for example, the transaction processing engine 140, trade-in processing engine 142, third-party services engine 144, and/or the like. The transaction processing engine 140 may, for example, be configured to coordinate the overall process of purchasing a vehicle, obtaining financing for the vehicle, and other transactions related to the purchase. The trade-in processing engine 142 may, for example, be configured to facilitate generation of an offer to purchase a user's existing vehicle and account for that credit in the transaction while purchasing another vehicle. The third party services engine 144 may, as described above, be configured to communicate with the various third-party data and service providers 112, 114 in order to, for example, facilitate purchasing of add-ons like insurance, warranties, aftermarket parts and products, and/or the like, and/or to facilitate financing through a third party financing provider system.

As mentioned above, one benefit of systems as disclosed herein is the potential for increased data privacy. For example, one option for generating a car insurance quote would be for the third party services engine 144 to receive from the unified marketplace system 104 private details about the user that is purchasing insurance, send those details to a third party service provider 114, such as an insurance provider, and receive a quote from that insurance provider to pass on to the end user. However, the systems disclosed herein in some embodiments can facilitate such quotes in a more privacy conscious fashion. For example, the third party services engine 144 can be configured to present an API to the third party service providers 114 that enables the third-party service providers to "call in" to describe promotions, products, services, and/or the like that the company associated with the unified marketplace system 104 can offer to their customers. The third party service providers can include a description of their promotions, products, and/or services along with a profile of the types of customers they would like to reach. This information can then be used by the backbone system 102 and/or the unified marketplace system 104 to generate offers of those third party services to an end user without having to provide the end user's private details to the third party service provider unless and until the user decides to move forward with such a service.

It should be noted that the various modules, databases, engines, and the like illustrated in FIG. 1 as being in the backbone system 102 or unified marketplace system 104 can be distributed differently. For example, some of the components of the unified marketplace systems 104 may be included in the backbone system 102, and/or some of the components of the backbone system 102 may be included in the unified marketplace systems 104. Further, in some embodiments, all or most of the components of the unified marketplace system 104 and backbone system 102 may be integrated into a single system.

Example Vehicle Financing and Purchase Process

Figure 4B:
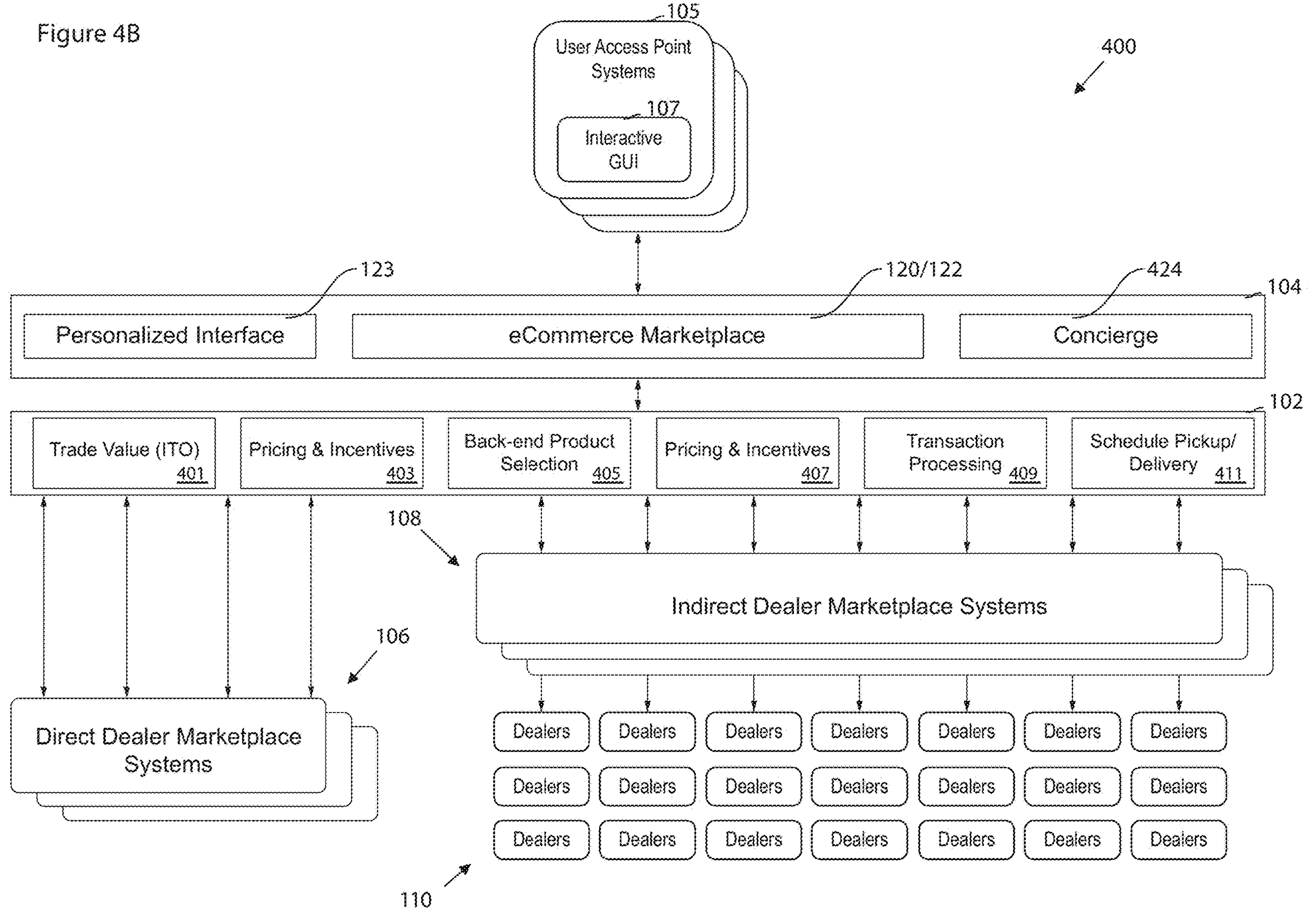

FIG. 2 illustrates an example embodiment of a process flow diagram that presents one example of a vehicle purchasing and financing process 201 as could be implemented by a unified unique items e-commerce system, such as the system 100 illustrated in FIG. 1 or any of the other systems disclosed herein, such as the systems 400 illustrated in FIGS. 4A-4C.

As indicated in FIG. 2, much of the process is facilitated by the unified marketplace system 104, with the backbone system 102 supporting the marketplace system 104 at many steps along the way. In this embodiment, the unified marketplace system 104 is a system that is operated by or for a particular lender, named "Lender 1" in this diagram. Although it is not necessary for the unified marketplace system to be run by or for a lender, it can be preferable for the system to be run by or for a lender for, among other reasons, data privacy reasons. For example, if a lender already has a pre-existing relationship with a particular user, the lender likely already has most if not all of the private information of that user that would be required to purchase and/or finance a vehicle. By maintaining most if not all of the transaction within that lender's system, it may reduce the risk of improper disclosure of private user data to third parties.

The process flow begins at block 203, where a user can shop dealer inventory online. For example, a user may utilize a user access point system 105 to communicate with a unified marketplace system 104, and the product search and selection engine 120 of the unified marketplace system 104 may be configured to enable the user to search for and select from vehicles offered by any of the dealer marketplace systems 106, 108. In order to facilitate this, the unified marketplace system 104 may communicate over a network with the backbone system 102 in order to obtain dealer pricing and incentives and any other data necessary to describe to the user the inventory that is available. This communication with the backbone system 102 is illustrated by block 205.

After the user has selected a vehicle to purchase, the process flow proceeds to a checkout process that begins at block 207. At block 207, the system may confirm the user's contact details and preferred communication method. At block 209, the system may be configured to offer the user a number of options for financing the vehicle. For example, the system can enable the user to pay cash without any financing, use financing provided by Lender 1, or use financing by an alternative lender. It should be noted that, even though the present embodiment illustrates a system that is operated by or for Lender 1, Lender 1 may have its own requirements as to who it would like to lend money to, and in a case that a user of the system does not meet Lender 1's requirements, it can be desirable to allow Lender 1 to still process the transaction while offering financing from alternative lenders.

The process flow then varies depending on how the user is financing the vehicle. If the user is paying cash, the process flow proceeds to block 225 and proceeds as described below. If the user would like to use financing from Lender 1, the process flow proceeds to block 211. At block 211, the system may be configured to obtain any necessary information from the user such as a completed credit application at block 213, a driver's license photo at block 215, proof of insurance at block 217, and/or the like, and to then make a determination as to whether the user is approved for Lender 1 financing. If the user is approved, the process flow proceeds to block 219, and the system can be configured to offer one or more approved financing options to the user for selection. In this case, since Lender 1 is operating the marketplace system 104, and Lender 1's financing is being used, little if any private details about the user need to be provided from the marketplace system 104 to the backbone system 102. As part of the loan evaluation process, the system may be configured to analyze a value of the vehicle being purchased. For example, the system may be configured to contact one or more vehicle valuation services (e.g., one or more third party data providers 112), and provide to the vehicle valuation service data about the vehicle in the format required by that specific service, as discussed in greater detail above.

If Lender 1 financing is not approved at block 211, or if the user selects non-Lender 1 financing at block 209, the process flow proceeds to block 221. At block 221, the system can be configured to offer one or more financing options that are preferred by the specific dealer that is offering the current vehicle for sale. To facilitate such transaction, the unified marketplace system 104 can be configured to communicate with the backbone system 102 as shown at block 223. The backbone system 102 may then be configured to communicate with the dealer marketplace systems and/or third-party service providers to facilitate the non-Lender 1 financing. As indicated by block 224, as the user proceeds through the financing process, the system can be building and displaying a monthly payment based on the options the user has selected. An example of this is shown in FIGS. 3B and 3C, described below.

With continued reference to FIG. 2, at block 225, the system may be configured to account for a trade-in in the transaction. For example, the system may be configured to provide an offer to the user at block 227 for purchase of the user's existing vehicle. Such offer can be accounted for at block 225 and enable the user to accept or decline such offer. In some embodiments, the unified marketplace system 104 is configured to communicate with the backbone system 102 at block 229 to facilitate such offers. For example, the backbone system 102 may be configured to communicate with the dealer marketplace systems 106 and/or 108 in order to obtain one or more offers from those dealers to buy the user's existing vehicle. In some embodiments, the offer to buy the user's existing vehicle may be from the same dealer that is selling the user the current vehicle. Another benefit of using the backbone systems 102 described herein, however, is that the offer to purchase the user's existing vehicle does not have to be from the same dealer that is selling the current car. The offer to buy the user's existing vehicle may be from a completely separate dealer, but the unified e-commerce system 100 can allow the transaction to be conducted seamlessly and to appear as a single transaction to the end user. Similar to the loan evaluation process, the system may be configured to analyze a value of the vehicle being traded in as part of the trade in offer process. For example, the system may be configured to contact one or more vehicle valuation services (e.g., one or more third party data providers 112), and provide to the vehicle valuation service data about the vehicle in the format required by that specific service, as discussed in greater detail above.

At block 231, the system that can be configured to enable the user to select dealer service and protection products. For example, the unified marketplace system 104 may be configured to communicate with the backbone system 102 at block 233 to determine what specific dealer service and add-on products are offered by the dealer that is selling the current vehicle and present those to the user. Such services may include, for example, warrantees, undercoating, paint protection, and/or the like.

At block 235, the unified marketplace system 104 can be configured to present the final deal terms to the user for review. The system may be configured to communicate with the backbone system 102 at block 237 in order to obtain details about the deal terms for presentation to the user. These terms may include, for example, the tax, title, and license fees required for this transaction.

At block 239, the system can be configured to enable the user to schedule a pickup or delivery of the vehicle. The unified marketplace system 104 may communicate with the backbone system 102 at block 241 in order to facilitate such pickup or delivery. At block 243, the system can be configured to enable the user to electronically sign any documents required to complete the transaction. The system can also be configured to communicate with the backbone system 102 at block 245 in order to perform the final transaction processing. Finally, for a system like illustrated in FIG. 1 that includes a personalized interface 123, at block 247 the system may be configured to load the newly purchased vehicle into that personalize interface 123. This may enable, for example, the user to interact with the system in the future to track maintenance of the vehicle, order new services for the vehicle, such as maintenance service or insurance, and/or the like.

Figure 3C:
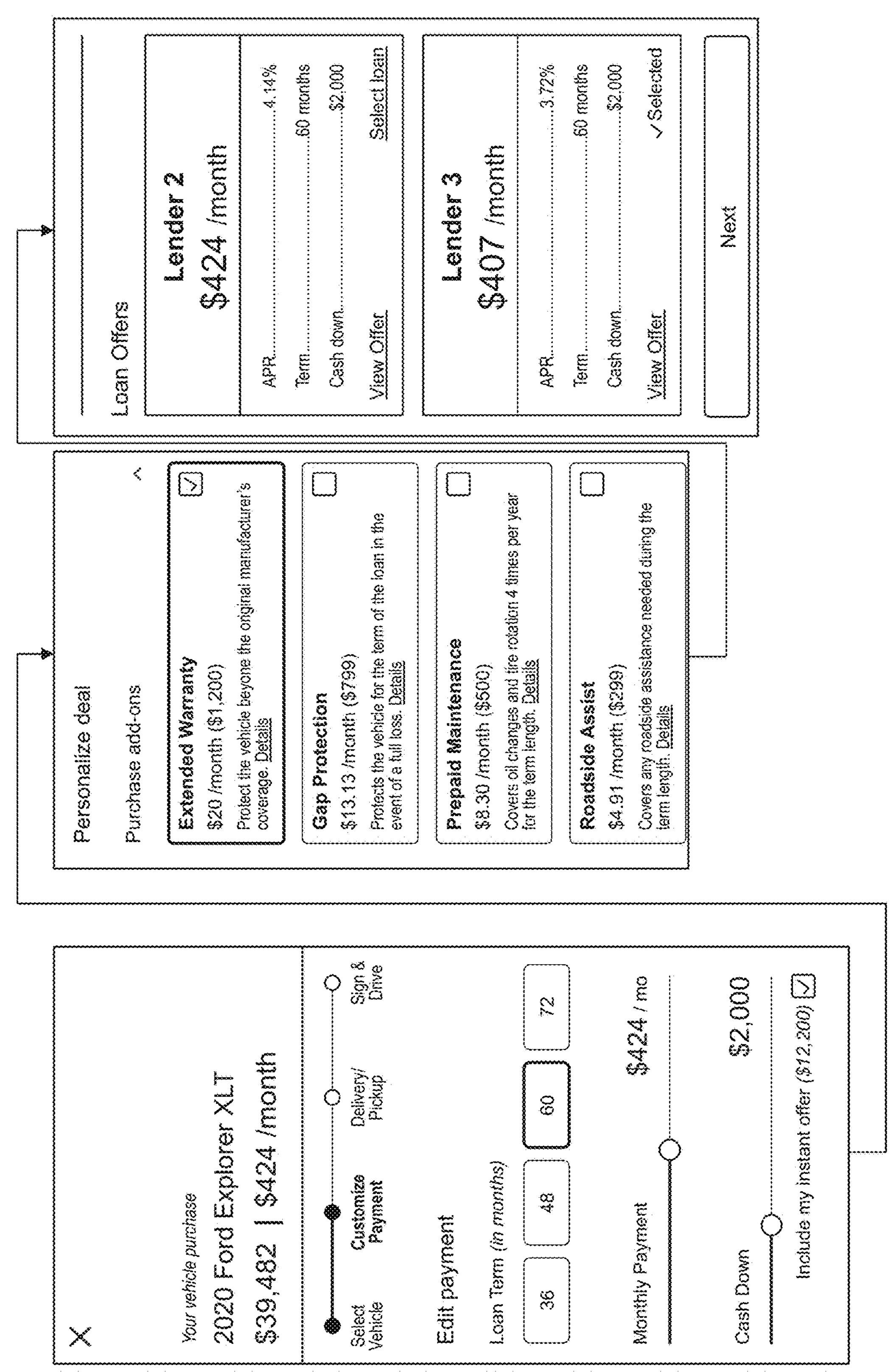

Example Graphical User Interface for Facilitating Vehicle Financing and Purchase Process FIGS. 3A-3D illustrate example embodiments of graphical user interfaces that may be used by a user to conduct at least a portion of the process flow illustrated in FIG. 2. These example figures show a graphical user interface as presented on a smartphone device, but similar concepts may be used with other types of GUI's, too. As discussed above with reference to FIG. 2, in this embodiment, the app that is presenting the graphical user interface is run by a particular lender, in this case Lender 1, as shown at the top of FIG. 3A.

With reference to FIG. 3A, these screenshots show that a user has searched for and selected a particular vehicle to potentially purchase online. For example, the user may have used the graphical user interface to communicate with the unified marketplace system 104 in order to search for, filter, sort, etc. vehicles and decide on the particular vehicle shown in FIG. 3A. This may involve, for example, the process of blocks 203 and 205 of FIG. 2. The screenshot of FIG. 3A also illustrates at least a couple other portions of the process flow of FIG. 2. For example, toward the bottom of the screenshot is a portion that asks the user whether to include their instant offer, which is offering to pay the user $12,200 for their existing vehicle. The system may develop such offer, for example, at blocks 227 and 229 of FIG. 2. The screenshot of FIG. 3A is also illustrating that the lender that is running this unified marketplace system is offering an exclusive price to the user, such as to help entice the user to use that lender's financing. Depending on which financing the user would like to use, however, the user interface may act differently, as described below.

FIGS. 3B and 3C illustrate two examples of payment customization using the graphical user interface. FIG. 3B illustrates payment customization when Lender 1 (the lender that is running this unified marketplace system) is chosen as the lender, and FIG. 3C illustrates payment customization using alternative financing. These screenshots illustrate examples of what may be shown to a user when the process flow of FIG. 2 is at blocks 209 through 235. With reference to FIG. 3B, the user is able to select different options, such as a payment term, a desired monthly payment, and amount of cash down, whether to include the instant offer for the user's current vehicle (i.e. as a "trade-in"), whether to include any add-ons such as extended warranties, prepaid maintenance, and the like. These various options may be generated by the unified marketplace system 104 communicating with the backbone system 102, such as is shown at blocks 223, 229, 233, and 237 of FIG. 2. FIG. 3C illustrates similar screenshots to FIG. 3B, except the loan offers are for different lenders than Lender 1.

Figure 3D:
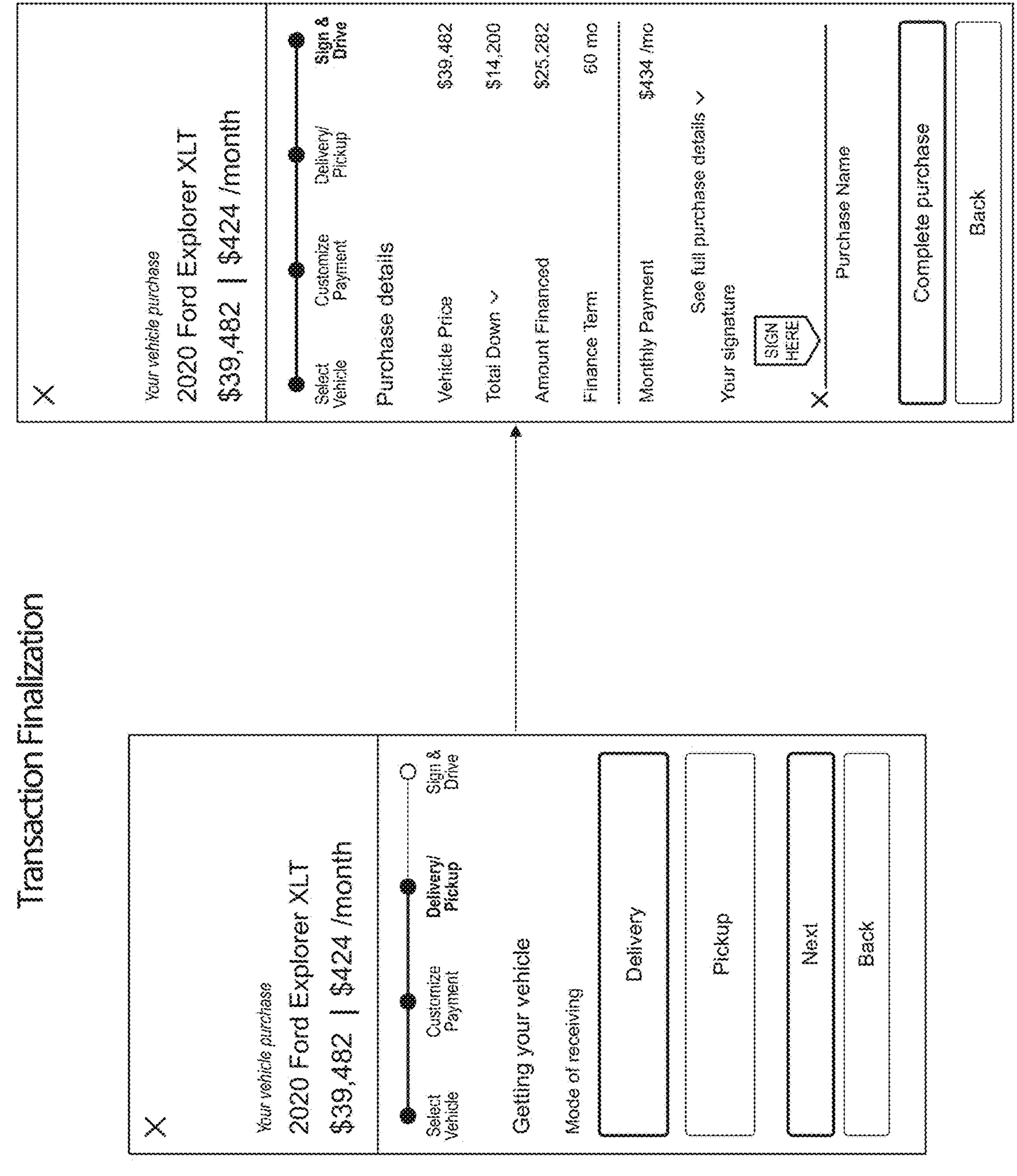

FIG. 3D illustrates example screenshots for conducting transaction finalization, such as when processing blocks 239 through 245 of the process flow diagram of FIG. 2. The user is given the option to have the vehicle delivered or to pick it up, which can be coordinated at blocks 239 and 241 by the unified marketplace system 104 communicating with the dealer marketplace system through the backbone system 102. The transaction can then be finalized by the user signing their name and clicking the complete purchase button. The system on the backend can then finalize the transaction at block 245.

Additional Examples of Unified E-Commerce Systems for Unique Items

FIGS. 4A-4C illustrate additional embodiments of block diagrams of unified e-commerce systems for unique items 400. The systems 400 illustrated in FIGS. 4A-4C are similar to the unique items e-commerce system 100 illustrated in FIG. 1, and any features of the system shown in FIG. 1 can be used with the systems shown in FIGS. 4A-4C, and vice versa. Similar reference numbers are used to refer to similar components. The three versions of the unified unique items e-commerce system 400 shown in FIGS. 4A-4C are shown in varying levels of abstraction. FIG. 4A shows the backbone and marketplace systems 102, 104 at a high level, FIG. 4B illustrates additional detail of the backbone and marketplace systems 102, 104, and FIG. 4C illustrates even further detail of the backbone system 102.

With reference to FIG. 4A, the unified unique items e-commerce system 400 comprises an e-commerce backbone system 102 that communicates with a plurality of direct dealer marketplace systems 106 and indirect dealer marketplace systems 108. The indirect dealer marketplace systems 108 in turn communicate with a plurality of dealer listing systems 110. The unified unique items e-commerce system 400 further comprises an e-commerce platform 104 that, in this embodiment, is run by or for Lender 1. The e-commerce platform 104 may alternatively be called a unified marketplace system 104. The e-commerce platform 104 desirably communicates with the e-commerce backbone 102 via an API, such as the API presented by the marketplace API engine 132 of FIG. 1. As with the system shown in FIG. 1, the e-commerce backbone 102 desirably translates for the e-commerce platform between a standard data model used by the API and the various requirements of the various dealer marketplace systems. Finally, the unified unique items e-commerce system 400 comprises a plurality of user access point systems 105 similar to the user access point systems 105 of FIG. 1. The user access point system 105 may be, for example, user smart phones, laptop computers, tablet computers, and/or the like. Although not shown in FIGS. 4A and 4B, the e-commerce backbone system 102 may further communicate with one or more third-party data providers and/or third-party service providers, similar to as shown in FIG. 1.

Turning to FIG. 4B, FIG. 4B illustrates additional details of the backbone system 102 and unified marketplace system 104. This figure shows that the unified marketplace system 104 further comprises a personalized interface 123, an e-commerce marketplace 120/122, and a concierge module 424. The personalize interface 123 may be similar to the personalized interface 123 of FIG. 1, and the e-commerce marketplace 120/122 may be configured to perform similar functionality as the product search and selection engine 120 and transaction processing interface 122 of FIG. 1. The concierge module 424 is an optional feature that, for example, may enable the unified marketplace system 104 to provide additional support or help to a user, such as through a human or AI customer service representative.

With continued reference to FIG. 4B, the backbone system 102 illustrates a plurality of functions 401-411 that the backbone system 102 can implement. Each of these functions may be implemented as their own software module, some or all of them may be combined into combined software modules, and/or these functions may be implemented by the components illustrated in FIG. 1, such as the transaction processing engine 140, trade-in processing engine 142, and third party services engine 144. The trade value module 401 may, for example, be configured to generate an offer for a user's existing vehicle in order to enable the user to trade that vehicle in when purchasing a new vehicle. The pricing and incentives module 403 may be configured to, for example, retrieve details from the various dealer marketplace systems as to pricing and incentives for vehicles, and present that information to the unified marketplace system 104 through a standardized data model. The back-end product selection module 405 may be configured to, for example, analyze the preferences and/or search queries of a particular user as provided to the backbone system 102 by the unified market play system 104, and to assist the unified marketplace system 104 in presenting search results to the user. The lender selection module 407 may, for example, be configured to analyze the details of a particular transaction and communicate with one or more lender systems in order to facilitate lending offers to the user during the transaction. The transaction processing module 409 may, for example, be configured to finalize a transaction, such as by getting signatures, getting acceptance of deal terms, and/or the like. Finally, the schedule pickup/delivery module 411 may be configured to, for example, communicate with the dealer marketplace systems 106, 108 to coordinate delivery or pickup of a purchased vehicle.

The embodiment of the unified unique items e-commerce system 400 illustrated in FIG. 4C illustrates even further detail of various modules or functions the backbone system 102 can implement. Further, FIG. 4C illustrates the third party data providers 112 and third party service providers 114 that, for simplicity, are not shown in FIGS. 4A and 4B, but may be present in alternative versions of FIGS. 4A and 4B.

One way the backbone system 102 presents more detail in FIG. 4C is that a plurality of dealer service modules or features are shown. The various dealer services may include, for example, maintenance reminders 413, recalls 415, offers 417, scheduling of service 419, scheduling a pickup 421, tracking service history 423, and/or the like. Some of these services may be dealer services that are scheduled and/or implemented as part of the original purchase transaction, such as at block 231 of the process flow of FIG. 2. On the other hand, some of these services may also or alternatively be services that can be coordinated by the backbone system 102 at a later date.

Another way the backbone system 102 presents more detail in FIG. 4C is that a number of third party service functions or modules are illustrated. For example, FIG. 4C illustrates that the backbone system 102 can be configured to process insurance quotes and offers 425, 427, either as part of the original purchase transaction or at a later date. The system may also be configured to enable a user to search for parts and maintenance, purchase parts and maintenance, and receive offers for parts and maintenance at blocks 429, 431, and 433. The system can also be configured to conduct remarketing services at blocks 435 and 437, such as by analyzing current vehicles and/or services offered for sale and presenting offers for such items to past customers. The system can also be configured to monitor vehicles for recalls at block 439 and present offers to users for new car sales at block 441.

It should be noted that each embodiment of a backbone system 102 may not necessarily include every module or function depicted in FIGS. 4B and 4C, and some backbone systems 102 may have different or additional modules or functions included. One benefit of including some or all of these various modules and functions is that these are all services that may be needed or beneficial in supporting an online transaction for unique items such as vehicles. Including some or all of these modules or functions in the backbone system 102 can be beneficial, for example, because it can allow utilization of the backbone system's normalization or translation features that enable an e-commerce marketplace 104 to offer such services to purchasers or other users without needing to know the intricacies of the data formats and other requirements of each individual service.

The final additional details shown in FIG. 4C versus FIGS. 4A and 4B are the three blocks at the bottom of the backbone system 102. Specifically, the backbone system 102 further comprises a data normalization and mapping service 443, a version management (API/Data Schema) module 445, and an authentication and verification module 447. The data normalization and mapping service 443 may, for example, contain similar functionality to the normalization engine 130 illustrated in FIG. 1. The version management (API/Data Schema) module 445 may, for example, perform similar functionality to the marketplace API engine 132 of FIG. 1. The authentication and verification module 447 may, for example, handle authentication of specific users, specific unified marketplace systems 104, and/or the like.

Example Data Model for Interfacing with an E-Commerce Backbone System

FIG. 5 illustrates an example embodiment of a standardized data model 501 that can be used for a unified marketplace system 104 to communicate with a backbone system 102 to facilitate the various functions described herein. The data model 501 includes a request data model 503 and a response data model 505. For example, the request data model 503 may be used by a unified marketplace system 104 in communications to the backbone system 102, and the response data model 505 may be used for the backbone system 102 to send responses back to the unified marketplace system 104. The example data model illustrated in FIG. 5 may be facilitated using an API, such as an API presented by the marketplace API engine 132 of FIG. 1, and the various objects or components of the data model may be communicated using JSON, XML, or any other suitable technique. The API that uses this standardized data model may be implemented using various techniques or standards, such as SOAP, XML-RPC, JSON-RPC, REST, and/or the like.

Desirably, the standardized data model 501 of FIG. 5 can enable any number of unified marketplace systems 104 to communicate with the backbone system 102 to conduct any of the transactions or features disclosed herein, regardless of the number of and fragmentation of dealer marketplace systems 106, 108 on the backend. This is because the backbone system 102 is configured to translate between this standardized data model 501 and the individual requirements of each individual dealer marketplace system and/or dealer listing system. Further, desirably, the standardized data model 501 of FIG. 5 can be used as a standardized format in which data received from third party systems is translated into, and in which data to be sent to such third party systems is translated from, depending on each third party system's requirements.

In use, a communication between a unified marketplace system 104 and the backbone system 102 may not include data for each and every object of the request and response data models 503, 505. The potential objects to include in a request, however, include dealer data 507, customer data 509, applicant data 511, cosigner data 513, vehicle data 515, backend products data 517, offer data 519, trade-in data 521, and vehicle receipt data 523. The potential objects to include in a response include loan decision data 525 and dealer availability data 527.

In some embodiments, the standardized data model includes fields associated with a plurality of categories of data, such as dealer data, acquirer data, unique item data, and/or the like. For example, with reference to FIG. 5, dealer data 507 may include data associated with the category of dealer data. Further, customer data 509, applicant data 511, cosigner data 513, and trade-in data 521 may all include data associated with the category of acquirer data. Additionally, vehicle data 515 may include data associated with the category of unique item data.

Although FIG. 5 illustrates one specific example of a data model that can be used to transmit standardized data back and forth between a unified marketplace system 104 and a backbone system 102, to translate third party data to or from, and/or the like, various other data models may be used, the data model of FIG. 5 may be expanded on, and/or the like.

Example Inventory Data Management and Transaction Processing Process

FIG. 7 illustrates an example embodiment of a process flow diagram for implementing inventory data management and transaction processing features of various systems disclosed herein. For example, the processes shown in the process flow diagram of FIG. 7 may be implemented by any of the systems described above with reference to FIG. 1 and FIGS. 4A-4C. Further, the process flow illustrated in FIG. 7 can overlap at least partially with the process flow illustrated in FIG. 2. Specifically, the process flow diagram of FIG. 2, described above, is primarily focused on the transaction processing features (e.g., the right half of FIG. 7), while FIG. 7 further illustrates some additional processes that can occur in an ongoing manner, such as before a specific transaction is processed.

At block 701, an electronic data feed is received. For example, the backbone system 102 of FIG. 1 may receive an electronic data feed from a direct dealer marketplace system 106 and/or an indirect dealer marketplace system 108. With reference to FIG. 7, the electronic data feed may be received by, for example, the normalization/translation system 751, which may encompass one or more features of the backbone system 102, such as the normalization engine 130 and/or dealer system interface 134. As discussed above, the electronic data feed may, for example, contain data related to inventory listed for sale by one or more unique item dealers.

At block 703, the electronic feed data is parsed, translated, and stored in an inventory database, item information cache database, and/or the like. For example, the item information cache 755 illustrated in FIG. 7 may correspond to the item information cache database 138 of FIG. 1. In some embodiments, the item information cache database may be referred to as an inventory database. In order to parse and/or translate the data from the electronic data feed into a format compatible with a standardized data model (such as the example standardized data model of FIG. 5, discussed above) the system may utilize one or more mappings stored in the mapping database or databases 753. The mapping database 753 may correspond to, for example, the dealer mappings database 136 of FIG. 1. The normalization/translation system 751 may, for example, retrieve one or more stored mappings from the mappings database 753 and use the mapping to translate data from the received electronic data feed into the standardized data model format before such information is stored in the item information cache 755. In some embodiments, at block 705, additional information, such as dealer-specific incentives and/or preferences may also be saved into the item information cache 755 and/or a separate database. In some embodiments, such information is included in the received electronic data feeds; however, in some embodiments, at least some of such information may be received through some other electronic means, manually entered, and/or the like.

Desirably, the process flow of blocks 701 to 705 is an ongoing and/or regularly repeated process that is not associated with a specific transaction being processed, and that can help to ensure that the backbone system's local inventory database or item information cache is kept up to date. It should be noted that, as discussed above, this ongoing process of keeping the item information cache database up to date with the latest inventory information from various dealer systems may not necessarily end up creating an item information cache or inventory database that includes every piece of information relevant to a particular listing that enables a user of the system to search for and select a unique item and complete an acquisition transaction associated with that item. For example, the item information cache database 755 may be configured to store enough information locally to provide fast searching and filtering, with at least some information related to listings being retrieved from or at least verified with the direct or indirect dealer marketplace systems 106, 108 at the time of a user conducting a search, filtering, and/or interacting with a listing through the unified marketplace systems. For example, in some embodiments, the item information cache database 755 may contain at least some textual and/or numerical information, such as vehicle make, model, year, listing price, and/or the like, and the system may be configured to retrieve additional data, such as images of the vehicle, additional textual and/or numerical information, and/or the like on demand or in real time when needed to support searching, filtering, and selecting an acquisition candidate unique item.

Turning now to the right half of the process flow illustrated in FIG. 7, this process flow may encompass some or all of the processes depicted in FIG. 2, discussed in greater detail above. At block 707, inventory data and/or dealer specific incentives may be transmitted. For example, the backbone system 102 of FIG. 1 may retrieve such information from the item information cache database 755 and/or from one or more third party systems such as dealer marketplace systems, and transmit that data to the unified marketplace system 104 to enable the unified marketplace system 104 to allow a user to search for and select an acquisition candidate unique item. Block 707 may, for example, correspond to block 205 of FIG. 2.

At block 709, an acquisition request is received. For example, a user of a unified marketplace system 104 may have selected an acquisition candidate unique item and indicated a desire to purchase the acquisition candidate unique item. At block 711, the system coordinates the details of the acquisition deal, translating any data as needed, such as any time a third party system that does not use the standardized data model needs to be contacted. At block 713, the acquisition transaction is finalized. The process between blocks 709 and 713 may, for example, encompass one or more or all of the blocks of the process flow of FIG. 2 between blocks 203 and 247. During those processes, various interactions with third-party systems may be required, such as electronic communications over a network with a direct dealer marketplace system 106, an indirect dealer marketplace system 108, one or more third party service providers 114, one or more third-party data providers 112, and/or the like. Any time such communications require translation between a standardized data model (such as the standardized data model of FIG. 5, discussed above) and a data format, API request and response format, and/or the like that is specific to the third party system, the normalization/translation system 751 may be used to conduct such translations using, for example, one or more mappings stored in the mapping databases 753. Further, at any time during the transaction processing process illustrated in blocks 707 through 713, the system may be configured to communicate with the direct or indirect dealer marketplace systems to receive updates to information stored in the item information cache from the process of blocks 701 through 705, and/or to supplement the information stored in the item information cache from the process of blocks 701 through 705.

Example Data Mappings

FIGS. 8A, 8B, 9A, and 9B illustrate four examples of mappings that may be stored in one or more mapping databases, such as mapping databases 136 or 753 discussed above. It should be noted that these examples are simplified examples intended to illustrate the mapping concepts, but that are not intended to include each field or translation that may occur for a specific mapping. In practice, the mappings stored in the databases may be more detailed, include additional fields, translations, and/or actions, and be converted from the human readable format of these figures into computer readable code, regular expressions, and/or the like.

FIGS. 8A and 8B illustrate first and second example feed mappings, respectively, that may be stored in one or more databases of the systems disclosed herein. These mappings may be used to, for example, translate data received in an electronic data feed from various third party systems, such as dealer marketplace systems, into data compatible or compliant with a standardized data model, such as the standardized data model of FIG. 5. In some embodiments, such data is stored in one or more databases of the systems disclosed herein. In some embodiments, at least some of such translations may occur in real time as needed as a user is interacting with a unified marketplace system to, for example, search for and select an acquisition candidate unique item and process an acquisition transaction.

These example feed mappings include two main portions, namely a general information section 801 and a translations section 803. The general information section 801 may include general information about the mapping, such as the feed source the mapping is applicable to and the data type provided by that feed source. For example, the mapping of FIG. 8A is associated with a first direct dealer marketplace system that provides its electronic feed in a comma separated value (CSV) format, while the mapping of FIG. 8B is associated with a second direct dealer marketplace system that provides its electronic feed in a tab separated value (TSV) format. The general information section 801 in some embodiments may include other and/or different information relevant to the particular electronic feed the mapping is associated with.

The translations section 803 comprises a variety of information that defines how one or more fields of information from the electronic feed map onto one or more fields of information in the standardized data model. For example, with reference to FIG. 8A, the mapping is showing translations associated with four fields provided by electronic feed of direct dealer marketplace system one. The mapping of FIG. 8A corresponds to the example discussed above with reference to a feed providing information on a 2015 Lexus RX 350 vehicle. In this case, fields one and two correspond to the standardized data model fields vehicle:year and vehicle:make, respectively. Because these fields correspond directly, the data from these fields is translated directly into the corresponding data model fields. It should be noted, however, that although a feed mapping as shown in FIG. 8A may indicate that there is a one-to-one translation between a feed field and a standardized data model field, some modification to the data may still occur. For example, in field one, the year information may be provided in a text format from the electronic feed, and the system may be configured to convert that text into a numeric format when entering the data into the local database.

Moving to fields three and four, in this example, each of fields three and four provided by the direct dealer marketplace system one include information corresponding to a plurality of fields in the standardized data model. Accordingly, in this case, the information provided in field three is separated into two standardized data model fields, a and b, corresponding to the vehicle:model and vehicle:trim standardized data model fields, and the information provided in field four is separated into three standardized data model fields, a, b, and c, corresponding to the vehicle:subtrim, vehicle:drivetype, and vehicle:body style standardized data model fields. The series of dots at the bottom of the feed mapping is intended to indicate that this is merely an example of a few translations, and in practice the feed mapping may include a number of additional translations, different translations, and/or the like.

FIG. 8B illustrates a second example feed mapping that is similar to the example feed mapping of FIG. 8A, but that is configured to translate data from a feed having a different format. Specifically, the feed from direct dealer marketplace system two is transmitted in TSV format instead of CSV format, which will cause the feed to be parsed into specific fields differently than for feed mapping one. Further, once the feed has been parsed into particular fields, the translations are different in this mapping. In this example, feed fields one and two each include textual information corresponding to two standardized data model fields. Feed fields three and four each include a textual representation of a number, namely a price of a vehicle and a mileage of a vehicle, and the translation for these fields includes converting the price into a number that is rounded to two decimal places, and converting the mileage into a number that is rounded to the closest whole number.

In some embodiments, the translations that occur based on these mappings may conduct additional checks, translations, and/or the like. For example, one third party system may use a different term for the items in a particular standardized data model field, and the system may be configured to change that term into the term used in the standardized data model. Further, some mappings may include lists, ranges, and/or the like indicating allowable values for the standardized data model fields, and the system may be configured to convert values from the feed into one of those allowable values, indicate that there is an error in the data when data from the feed is different than the allowable values, and/or the like.

In some embodiments, the mappings stored in the mappings databases may correspond to how data received from a third party system and/or data sent to a third party system is encoded. For example, the encoding of data may refer to one or more of, for example, the feed data type (such as CSV, TSV, binary, and/or the like), the number of fields, the data type used in each field, how much information is stored in each field, whether an individual field is associated with more than one attribute or only a single attribute, whether the text associated with a field is spelled out in the data (as opposed to using numbers or letters to refer to categories-such as using the number 1 to refer to "all wheel drive" and the number 2 to refer to "two wheel drive", or using the number 1 to refer to the color red, the number 2 to refer to the color blue, and/or the like), and/or the like. In some embodiments, the format in which a dealer marketplace system encodes its data may be referred to as a dealer marketplace-specific data format.

FIGS. 9A and 9B illustrate two example mappings that could be stored in one or more databases of the systems disclosed herein and could be used to translate data provided to or received from third party systems between a standardized data model, such as the standardized data model of FIG. 5, and a data format compatible with each third party system. Like the mappings of FIGS. 8A and 8B, the mappings of FIGS. 9A and 9B include a general information section 801 and a translations section 803. In the general information section 801, these examples indicate what third party system the mapping is applicable to and what communication protocol is used with that system. In this case, the mapping of FIG. 9A is associated with direct dealer marketplace system one, and the example mapping of FIG. 9B is associated with insurance provider one (for example, a third party service provider that can be used to incorporate purchasing of insurance for a vehicle as part of a transaction process). Further, in this case, the mappings are indicating that direct dealer marketplace system one utilizes a REST API protocol and that the insurance provider one utilizes a SOAP API protocol. As discussed above, these mappings are merely examples, and the mappings stored in the databases may include more and/or different information, such as additional details around how to use the communication protocol, a URL to reach the system at, authentication credentials, and/or the like.

Like the mappings of FIGS. 8A and 8B, the translations section 803 of the mappings of FIGS. 9A and 9B illustrate how particular standardized data model fields may correspond to a third party API field. One difference between these translations and the translations of FIGS. 8A and 8B is that, in practice, the feed processing conducted by the mappings of FIGS. 8A and 8B may be more of a one-way process, whereas the mappings of FIGS. 9A and 9B may be more of a two-way translation as, for example, the backbone system 102 communicates back and forth with a number of third party systems in order to conduct the various transaction processing processes illustrated in FIGS. 2 and 7.

Computing System

Figure 6:
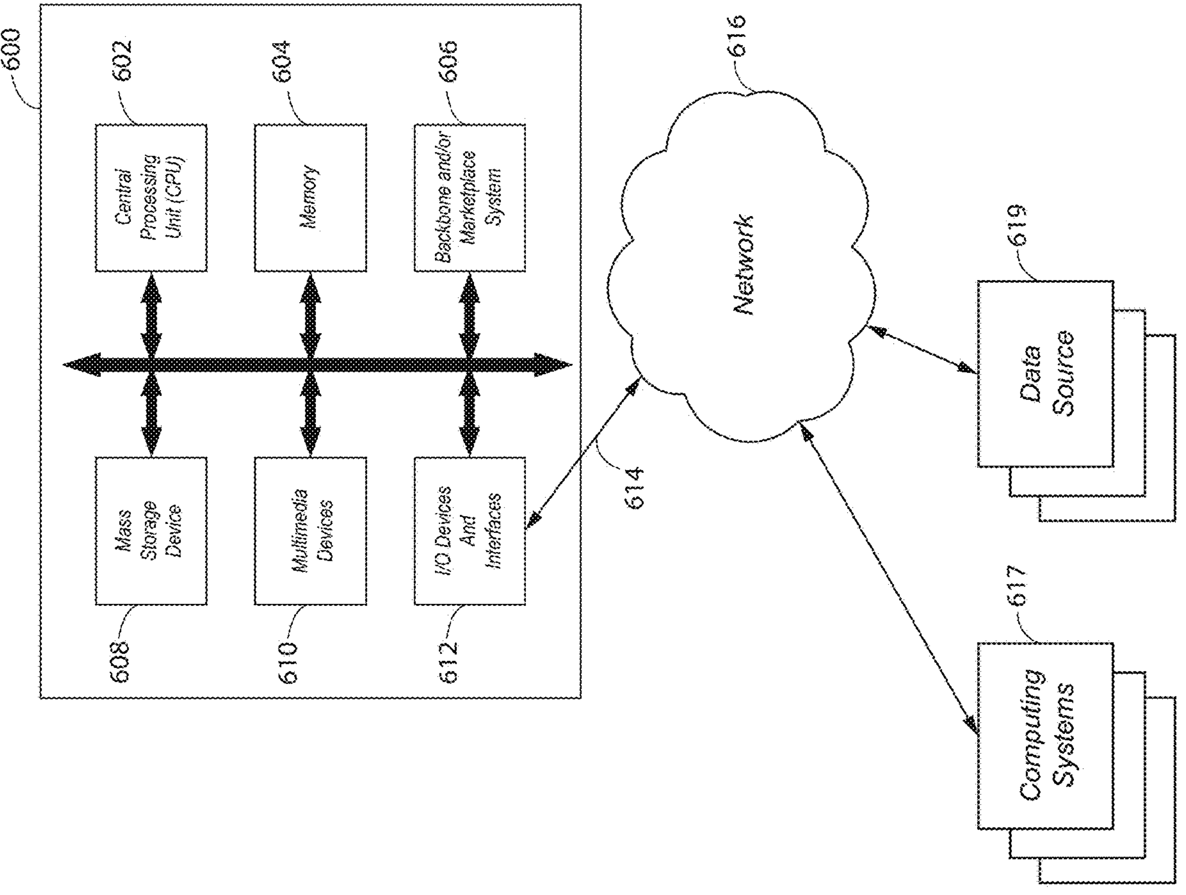
FIG. 6 is a block diagram depicting an embodiment of a computer hardware system configured to run software for implementing one or more embodiments of the systems described herein.

FIG. 6 is a block diagram depicting an embodiment of a computer hardware system configured to run software for implementing one or more embodiments of the systems described herein.

In some embodiments, the computer clients and/or servers described above take the form of a computing system 600 illustrated in FIG. 6, which is a block diagram of one embodiment of a computing system that is in communication with one or more computing systems 617 and/or one or more data sources 619 via one or more networks 616. The computing system 600 may be used to implement one or more of the systems and methods described herein. In addition, in one embodiment, the computing system 600 may be configured to manage access or administer a software application. While FIG. 6 illustrates one embodiment of a computing system 600, it is recognized that the functionality provided for in the components and modules of computing system 600 may be combined into fewer components and modules or further separated into additional components and modules.

Backbone and/or Marketplace System Module

In one embodiment, the computing system 600 comprises a backbone and/or marketplace system module 606 that carries out the functions described herein, including any one of techniques described above. The backbone and/or marketplace system module 606 and/or other modules may be executed on the computing system 600 by a central processing unit 602 discussed further below.

In general, the word "module," as used herein, refers to logic embodied in hardware or firmware, or to a collection of software instructions, possibly having entry and exit points, written in a programming language, such as, for example, COBOL, CICS, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into submodules despite their physical organization or storage.

Computing System Components

In one embodiment, the computing system 600 also comprises a mainframe computer suitable for controlling and/or communicating with large databases, performing high volume transaction processing, and generating reports from large databases. The computing system 600 also comprises a central processing unit ("CPU") 602, which may comprise a conventional microprocessor. The computing system 600 further comprises a memory 604, such as random access memory ("RAM") for temporary storage of information and/or a read only memory ("ROM") for permanent storage of information, and a mass storage device 608, such as a hard drive, diskette, or optical media storage device. Typically, the modules of the computing system 600 are connected to the computer using a standards based bus system. In different embodiments, the standards based bus system could be Peripheral Component Interconnect (PCI), Microchannel, SCSI, Industrial Standard Architecture (ISA) and Extended ISA (EISA) architectures, for example.

The computing system 600 comprises one or more commonly available input/output (I/O) devices and interfaces 6012, such as a keyboard, mouse, touchpad, and printer. In one embodiment, the I/O devices and interfaces 612 comprise one or more display devices, such as a monitor, that allows the visual presentation of data to a user. More particularly, a display device provides for the presentation of GUIs, application software data, and multimedia presentations, for example. In one or more embodiments, the I/O devices and interfaces 612 comprise a microphone and/or motion sensor that allow a user to generate input to the computing system 600 using sounds, voice, motion, gestures, or the like. In the embodiment of FIG. 6, the I/O devices and interfaces 612 also provide a communications interface to various external devices. The computing system 600 may also comprise one or more multimedia devices 610, such as speakers, video cards, graphics accelerators, and microphones, for example.

Computing System Device/Operating System

The computing system 600 may run on a variety of computing devices, such as, for example, a server, a Windows server, a Structure Query Language server, a Unix server, a personal computer, a mainframe computer, a laptop computer, a tablet computer, a cell phone, a smartphone, a personal digital assistant, a kiosk, an audio player, an e-reader device, and so forth. The computing system 600 is generally controlled and coordinated by operating system software, such as z/OS, Windows 95, Windows 98, Windows NT, Windows 2000, Windows XP, Windows Vista, Windows 7, Windows 8, Windows 10, Linux, BSD, SunOS, Solaris, Android, iOS, BlackBerry OS, or other compatible operating systems. In Macintosh systems, the operating system may be any available operating system, such as MAC OS X. In other embodiments, the computing system 600 may be controlled by a proprietary operating system. Conventional operating systems control and schedule computer processes for execution, perform memory management, provide file system, networking, and I/O services, and provide a user interface, such as a graphical user interface ("GUI"), among other things.

Network

In the embodiment of FIG. 6, the computing system 600 is coupled to a network 616, such as a LAN, WAN, or the Internet, for example, via a wired, wireless, or combination of wired and wireless, communication link 614. The network 616 communicates with various computing devices and/or other electronic devices via wired or wireless communication links. In the embodiment of FIG. 6, the network 616 is communicating with one or more computing systems 617 and/or one or more data sources 619.

Access to the backbone and/or marketplace system module 606 of the computer system 600 by computing systems 617 and/or by data sources 619 may be through a web-enabled user access point such as the computing systems' 617 or data source's 619 personal computer, cellular phone, smartphone, laptop, tablet computer, e-reader device, audio player, or other device capable of connecting to the network 616. Such a device may have a browser module that is implemented as a module that uses text, graphics, audio, video, and other media to present data and to allow interaction with data via the network 616.

The browser module may be implemented as a combination of an all points addressable display such as a cathode-ray tube (CRT), a liquid crystal display (LCD), a plasma display, or other types and/or combinations of displays. In addition, the browser module may be implemented to communicate with input devices 612 and may also comprise software with the appropriate interfaces which allow a user to access data through the use of stylized screen elements such as, for example, menus, windows, dialog boxes, toolbars, and controls (for example, radio buttons, check boxes, sliding scales, and so forth). Furthermore, the browser module may communicate with a set of input and output devices to receive signals from the user.

The input device(s) may comprise a keyboard, roller ball, pen and stylus, mouse, trackball, voice recognition system, or pre-designated switches or buttons. The output device(s) may comprise a speaker, a display screen, a printer, or a voice synthesizer. In addition, a touch screen may act as a hybrid input/output device. In another embodiment, a user may interact with the system more directly such as through a system terminal connected to the score generator without communications over the Internet, a WAN, or LAN, or similar network.

In some embodiments, the system 600 may comprise a physical or logical connection established between a remote microprocessor and a mainframe host computer for the express purpose of uploading, downloading, or viewing interactive data and databases on-line in real time. The remote microprocessor may be operated by an entity operating the computer system 600, including the client server systems or the main server system, and/or may be operated by one or more of the data sources 619 and/or one or more of the computing systems 617. In some embodiments, terminal emulation software may be used on the microprocessor for participating in the micro-mainframe link.

In some embodiments, computing systems 617 who are internal to an entity operating the computer system 600 may access the backbone and/or marketplace system module 606 internally as an application or process run by the CPU 602.

URLs and Cookies

In some embodiments, one or more features of the systems, methods, and devices described herein can utilize a URL and/or cookies, for example for storing and/or transmitting data or user information. A Uniform Resource Locator (URL) can include a web address and/or a reference to a web resource that is stored on a database and/or a server. The URL can specify the location of the resource on a computer and/or a computer network. The URL can include a mechanism to retrieve the network resource. The source of the network resource can receive a URL, identify the location of the web resource, and transmit the web resource back to the requestor. A URL can be converted to an IP address, and a Doman Name System (DNS) can look up the URL and its corresponding IP address. URLs can be references to web pages, file transfers, emails, database accesses, and other applications. The URLs can include a sequence of characters that identify a path, domain name, a file extension, a host name, a query, a fragment, scheme, a protocol identifier, a port number, a username, a password, a flag, an object, a resource name and/or the like. The systems disclosed herein can generate, receive, transmit, apply, parse, serialize, render, and/or perform an action on a URL.

A cookie, also referred to as an HTTP cookie, a web cookie, an internet cookie, and a browser cookie, can include data sent from a website and/or stored on a user's computer. This data can be stored by a user's web browser while the user is browsing. The cookies can include useful information for websites to remember prior browsing information, such as a shopping cart on an online store, clicking of buttons, login information, and/or records of web pages or network resources visited in the past. Cookies can also include information that the user enters, such as names, addresses, passwords, credit card information, etc. Cookies can also perform computer functions. For example, authentication cookies can be used by applications (for example, a web browser) to identify whether the user is already logged in (for example, to a web site). The cookie data can be encrypted to provide security for the consumer. Tracking cookies can be used to compile historical browsing histories of individuals. Systems disclosed herein can generate and use cookies to access data of an individual. Systems can also generate and use JSON web tokens to store authenticity information, HTTP authentication as authentication protocols, IP addresses to track session or identity information, URLs, and the like.

Other Systems

In addition to the systems that are illustrated in FIG. 6, the network 616 may communicate with other data sources or other computing devices. The computing system 600 may also comprise one or more internal and/or external data sources. In some embodiments, one or more of the data repositories and the data sources may be implemented using a relational database, such as DB2, Sybase, Oracle, CodeBase and Microsoft® SQL Server as well as other types of databases such as, for example, a flat file database, an entity-relationship database, and object-oriented database, and/or a record-based database.

OTHER REMARKS

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The headings used herein are for the convenience of the reader only and are not meant to limit the scope of the disclosures or claims.

Any ranges disclosed herein also encompass any and all overlap, sub-ranges, and combinations thereof. Language such as "up to," "at least," "greater than," "less than," "between," and the like includes the number recited. Numbers preceded by a term such as "approximately," "about," and "substantially" as used herein include the recited numbers, and also represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount.

Although the features that have been disclosed in the context of certain preferred embodiments and examples, it will be understood by those skilled in the art that the present disclosure extends beyond the specifically disclosed embodiments to other alternative embodiments and/or uses of the disclosure and obvious modifications and equivalents thereof. Additionally, the skilled artisan will recognize that any of the above-described methods can be carried out using any appropriate apparatus. Further, the disclosure herein of any particular feature, aspect, method, property, characteristic, quality, attribute, element, or the like in connection with an embodiment can be used in all other embodiments set forth herein. For all of the embodiments described herein the steps of the methods need not be performed sequentially. Thus, it is intended that the scope of the present disclosure herein disclosed should not be limited by the particular disclosed embodiments described above.

What is claimed is:

1. A system for generating a unified marketplace, the system comprising:

a system interface configured to electronically communicate with one or more unified marketplace systems using a standardized data model;

a first database configured to store, in a format compatible with the standardized data model, data associated with a plurality of items listed for sale by a plurality of item dealers, wherein each of the plurality of items listed for sale comprises a combination of attributes;

a second database configured to store mappings that define translations between the standardized data model and one or more marketplace-specific data formats for each of a plurality of marketplace systems, wherein the translations comprise one or more value conversions, wherein the plurality of marketplace systems comprises a plurality of direct item dealer marketplace systems and a plurality of indirect item dealer marketplace systems;

a marketplace system interface configured to communicate over a computer network with each of the plurality of marketplace systems in order to at least:

receive a plurality of electronic feeds each comprising inventory data related to at least a portion of the plurality of items listed for sale by the plurality of item dealers, wherein at least some of the plurality of electronic feeds comprise item inventory data encoded differently than at least some other of the plurality of electronic feeds; and transmit and receive data to and from each marketplace system in a format compatible with the one or more marketplace-specific data formats;

a normalization engine configured to:

translate the inventory data of the received plurality of electronic feeds into data compliant with the standardized data model, wherein each translation uses a mapping stored in the second database and associated with a marketplace-specific data format;

store the translated inventory data in the first database; and translate data received from and to be sent to the plurality of marketplace systems, between data compliant with the standardized data model and data compliant with a marketplace-specific data format for each marketplace system, wherein each translation uses a mapping stored in the second database and associated with a marketplace-specific data format, wherein the system is further configured to automatically de-duplicate the translated inventory data, wherein the de-duplication comprises at least:

detecting, based on data received in the plurality of electronic feeds, that a first direct item dealer associated with a first direct item dealer marketplace system has transferred a first item to a second direct item dealer associated with a second direct item dealer marketplace system; and updating the stored translated inventory data such that data transmitted to the one or more unified marketplace systems will enable facilitation of an acquisition transaction for the first item through the second direct item dealer marketplace system and not through the first direct item dealer marketplace system;

wherein the de-duplication further comprises at least:

detecting, based on data received in the plurality of electronic feeds, that a first indirect item dealer associated with a first indirect item dealer marketplace system has sold a second item that is offered for sale through multiple indirect item dealer marketplace systems; and updating the stored translated inventory data such that data transmitted to the one or more unified marketplace systems will not enable facilitation of an acquisition transaction for the second item through any of the multiple indirect item dealer marketplace systems; and a transaction processing engine configured to:

receive, from the one or more unified marketplace systems through the system interface, acquisition request data in a format compatible with the standardized data model, the acquisition request data indicative of a request by a user to acquire an acquisition candidate item, wherein the acquisition candidate item is associated with one of the plurality of marketplace systems;

translate, using the normalization engine, at least a portion of the acquisition request data from the format compatible with the standardized data model to a format compatible with the one of the plurality of marketplace systems; and transmit, to the one of the plurality of marketplace systems through the marketplace system interface, the translated at least a portion of the acquisition request data.

2. The system of claim 1, wherein at least one of the plurality of marketplace systems is controlled by a third party.

3. The system of claim 1, further comprising:

at least one of the one or more unified marketplace systems, wherein the at least one of the one or more unified marketplace systems is configured to present an interactive graphical user interface that facilitates searching for and selection of the acquisition candidate item.

4. The system of claim 1, wherein the system interface is configured to communicate over a computer network with at least some of the one or more unified marketplace systems.

5. The system of claim 1, wherein at least one of the one or more unified marketplace systems is controlled by a third party.

6. The system of claim 1, wherein system is further configured to communicate over a computer network with one or more third party service provider systems, to facilitate inclusion of one or more third party services in the acquisition transaction of the acquisition candidate item.

7. The system of claim 6, wherein the one or more third party services comprises one or more of: a warranty service, an insurance service, or a financing service.

8. The system of claim 1, wherein the plurality of items listed for sale comprises at least one item type of: a vehicle type, a used vehicle type, or a real estate type.

9. The system of claim 1, wherein the standardized data model includes a plurality of categories of data, the plurality of categories including at least dealer data, acquirer data, and item data.

10. The system of claim 1, wherein the translating of the inventory data of the received plurality of electronic feeds into data compliant with the standardized data model comprises at least:

parsing a plurality of fields of data from an electronic feed; and separating at least some of the parsed data from a single field into multiple fields of the standardized data model.

11. The system of claim 1, wherein the second database is configured to store at least two different mappings for at least some of the plurality of marketplace systems, the at least two different mappings comprising a first mapping associated with electronic feed data, and a second mapping associated with facilitating acquisition transactions.

12. The system of claim 1, wherein the different encoding of the at least some of the plurality of electronic feeds comprises at least one of: delimiting data fields differently, ordering data fields differently, using a different number of data fields to provide a same amount of data.

13. A computer-implemented method for generating a unified marketplace, the computer-implemented method comprising:

storing, in a first database, mappings that define translations between a standardized data model and one or more marketplace-specific data formats for each of a plurality of marketplace systems, wherein the translations comprise one or more value conversions, wherein the plurality of marketplace systems comprises a plurality of direct item dealer marketplace systems and a plurality of indirect item dealer marketplace systems;

receiving, by a computer system over a computer network, from the plurality of marketplace systems, a plurality of electronic feeds each comprising item inventory data related to at least a portion of a plurality of items listed for sale by a plurality of dealers, wherein each of the plurality of items listed for sale comprises a combination of attributes, the attributes comprising one or more of feature attributes, condition attributes, or location attributes, wherein at least some of the plurality of electronic feeds comprise inventory data encoded differently than at least some other of the plurality of electronic feeds;

translating, by the computer system, the inventory data of the received plurality of electronic feeds into data compliant with the standardized data model, wherein each translation uses a mapping stored in the first database and associated with a marketplace-specific data format;

storing, in a second database, the translated inventory data;

automatically de-duplicating the translated inventory data, wherein the de-duplication comprises at least:

detecting, by the computer system, based on data received in the plurality of electronic feeds, that a first dealer associated with a first direct item dealer marketplace system has transferred a first item to a second dealer associated with a second direct item dealer marketplace system;

updating, by the computer system, the stored translated inventory data such that data transmitted to the one or more unified marketplace systems will enable facilitation of an acquisition transaction for the first item through the second direct item dealer marketplace system and not through the first direct item dealer marketplace system;

detecting, by the computer system, based on data received in the plurality of electronic feeds, that a first dealer associated with a first indirect item dealer marketplace system has sold a second item that is offered for sale through multiple indirect item dealer marketplace systems; and updating, by the computer system, the stored translated inventory data such that data transmitted to the one or more unified marketplace systems will not enable facilitation of an acquisition transaction for the second item through any of the multiple indirect item dealer marketplace systems;

transmitting at least a portion of the stored inventory data to one or more unified marketplace systems, to enable the one or more unified marketplace systems to facilitate searching for and selection of an acquisition candidate item by a user;

receiving, from the one or more unified marketplace systems, acquisition request data in a format compatible with the standardized data model, the acquisition request data indicative of a request by the user to acquire the acquisition candidate item, wherein the acquisition candidate item is associated with one of the plurality of marketplace systems;

translating, by the computer system, at least a portion of the acquisition request data from the format compatible with the standardized data model to a format compatible with the one of the plurality of marketplace systems; and transmitting, by the computer system over a computer network to the one of the plurality of marketplace systems, the translated at least a portion of the acquisition request data, wherein the computer system comprises one or more hardware computer processors in communication with one or more computer readable storage devices.

14. The computer-implemented method of claim 13, further comprising:

communicating, by the computer system over a computer network, with one or more third party service provider systems, to facilitate inclusion of one or more third party services in the acquisition transaction of the acquisition candidate item, wherein the one or more third party services comprises one or more of: a warranty service, an insurance service, or a financing service.

15. The computer-implemented method of claim 13, wherein the plurality of items listed for sale comprises at least one of:

a vehicle type, a used vehicle type, or a real estate type, and wherein each of the plurality of items listed for sale comprises a combination of attributes, the attributes comprising one or more of feature attributes, condition attributes, or location attributes.

16. A system for generating a marketplace, the system comprising:

a system interface configured to communicate over a computer network with a plurality of marketplace systems each listing a different set of items for sale, wherein the plurality of marketplace systems comprises a plurality of direct item dealer marketplace systems and a plurality of indirect item dealer marketplace systems, wherein each item of the different sets of items for sale comprises a combination of attributes, the attributes comprising one or more feature attributes, condition attributes, or location attributes;

a normalization engine configured to:

translate data received from the plurality of marketplace systems into data compliant with a standardized data model; and translate data to be sent to the plurality of marketplace systems from data compliant with the standardized data model into data compliant with requirements of each individual marketplace system;

a first database configured to store mappings that define translation methods for each individual marketplace system, wherein the translation methods comprise one or more value conversions; and a unified system interface configured to electronically communicate with one or more unified marketplace systems using data compliant with the standardized data model, to enable each of the one or more unified marketplace systems to facilitate item acquisition transactions by:

enabling a user to search for and select an acquisition candidate item within a set of candidate items that spans an inventory of multiple of the plurality of marketplace systems; and initiating the item acquisition transaction by transmitting transaction data to the unified marketplace system interface using the standardized data model, wherein the system interface is further configured to communicate with one of the plurality of marketplace systems that is associated with the acquisition candidate item, using at least a portion of the transaction data, translated by the normalization engine, to process the item acquisition transaction, wherein the system is further configured to automatically de-duplicate the translated data, wherein the de-duplication comprises at least:

detecting that a first direct item dealer associated with a first direct item dealer marketplace system has transferred a first item to a second direct item dealer associated with a second direct item dealer marketplace system; and updating the translated data such that the system enables facilitation of an acquisition transaction for the first item through the second direct item dealer marketplace system and not through the first direct item dealer marketplace system.

17. The system of claim 16, wherein the system is further configured to communicate with a plurality of third party data systems and a plurality of third party service provider systems, wherein the plurality of third party service provider systems comprises one or more of: a warranty provider system, an insurance provider system, or a financing provider system.

18. The system of claim 16, wherein each of the different sets of items listed for sale comprises at least one type of item a vehicle type, a used vehicle type, or a real estate type.

19. The system of claim 16, wherein the de-duplication further comprises at least:

detecting that a first indirect item dealer associated with a first indirect item dealer marketplace system has sold a second item that is offered for sale through multiple indirect item dealer marketplace systems; and updating the translated data such that the system will not enable facilitation of an acquisition transaction for the second item through any of the multiple indirect item dealer marketplace systems.

* * * * *